(12) United States Patent
Zuchoski et al.

(10) Patent No.: US 8,967,737 B2
(45) Date of Patent: Mar. 3, 2015

(54) WHEEL OF A TRACK ASSEMBLY OF A TRACKED VEHICLE

(75) Inventors: Jeremie Zuchoski, Sherbrooke (CA); Alain Lussier, St-François Xavier de Brompton (CA); Patrice Boily, St-Catherine-de-Hatley (CA)

(73) Assignee: Camoplast Solideal Inc., Sherbrooke (CA)

( * ) Notice: Subject to any disclaimer, the term of this patent is extended or adjusted under 35 U.S.C. 154(b) by 648 days.

(21) Appl. No.: 13/170,753

(22) Filed: Jun. 28, 2011

(65) Prior Publication Data

US 2012/0001478 A1 Jan. 5, 2012

Related U.S. Application Data

(60) Provisional application No. 61/359,938, filed on Jun. 30, 2010, provisional application No. 61/422,976, filed on Dec. 14, 2010.

(51) Int. Cl.
*B62D 55/14* (2006.01)
*B62K 5/01* (2013.01)

(52) U.S. Cl.
CPC .. *B62D 55/14* (2013.01); *B62K 5/01* (2013.01)
USPC .......................................... 305/137; 305/194

(58) Field of Classification Search
USPC .................. 305/137, 194, 136, 145, 160, 178
See application file for complete search history.

(56) References Cited

U.S. PATENT DOCUMENTS

| | | | |
|---|---|---|---|
| 4,538,860 A * | 9/1985 | Edwards et al. .............. 305/137 | |
| 4,583,791 A | 4/1986 | Nagata et al. | |
| 4,607,892 A | 8/1986 | Payne et al. | |
| 4,696,520 A | 9/1987 | Henke et al. | |
| 5,018,591 A | 5/1991 | Price | |
| 5,050,710 A | 9/1991 | Bargfrede | |
| 5,190,363 A * | 3/1993 | Brittain et al. ................ 305/199 |
| 5,368,115 A | 11/1994 | Crabb | |
| 5,997,109 A | 12/1999 | Kautsch | |
| 6,074,025 A * | 6/2000 | Juncker et al. ............... 305/130 |
| 6,206,492 B1 * | 3/2001 | Moser ........................... 305/194 |
| 6,299,264 B1 | 10/2001 | Kautsch et al. | |

(Continued)

OTHER PUBLICATIONS

U.S. Appl. No. 13/649,312, filed Oct. 2012, Zuchoski et al.

(Continued)

*Primary Examiner* — Glenn Dayoan
*Assistant Examiner* — Sunsurraye Westbrook
(74) *Attorney, Agent, or Firm* — Fish & Richardson P.C.

(57) ABSTRACT

A wheel for a track assembly of a tracked vehicle, such as, for example, an all-terrain vehicle (ATV), a snowmobile, a construction vehicle or an agricultural vehicle. The wheel in use is one of a plurality of wheels of the track assembly. The track assembly comprises an endless track disposed around the plurality of wheels, comprising an inner side for facing the plurality of wheels and a ground-engaging outer side for engaging the ground. The wheel comprises a wheel body comprising a hub portion, a rim portion, and a radially-extending portion between the hub portion and the rim portion. The wheel also comprises a covering on the body. The covering in use contacts the endless track's inner side. A material of the covering is different from a material of the wheel body. The wheel body and the covering may be mechanically interlocked. The covering may comprise a peripheral portion covering at least part of a peripheral side of the wheel body and a lateral portion covering at least part of a lateral side of the wheel body.

32 Claims, 22 Drawing Sheets

(56) References Cited

U.S. PATENT DOCUMENTS

| | | | |
|---|---|---|---|
| 6,416,142 B1 | 7/2002 | Oertley | |
| 6,652,043 B2 * | 11/2003 | Oertley | 305/137 |
| 6,948,784 B2 * | 9/2005 | Wodrich et al. | 305/202 |
| 7,137,675 B1 * | 11/2006 | Simula et al. | 305/194 |
| 7,222,924 B2 | 5/2007 | Christianson | |
| 7,252,348 B2 * | 8/2007 | Gingras | 305/136 |
| 7,798,260 B2 | 9/2010 | Albright et al. | |
| D644,670 S | 9/2011 | Barrelmeyer | |
| 2005/0103540 A1 | 5/2005 | Lavoie | |
| 2005/0104449 A1 | 5/2005 | Lavoie et al. | |
| 2011/0068620 A1 | 3/2011 | Delisle et al. | |
| 2011/0148189 A1 | 6/2011 | Courtemanche et al. | |
| 2011/0315459 A1 | 12/2011 | Zuchoski et al. | |
| 2012/0056473 A1 | 3/2012 | Hashimoto et al. | |
| 2012/0104840 A1 | 5/2012 | Zuchoski et al. | |
| 2012/0242142 A1 | 9/2012 | Kautsch et al. | |
| 2013/0134772 A1 | 5/2013 | Dandurand et al. | |
| 2013/0134773 A1 | 5/2013 | Dandurand et al. | |

OTHER PUBLICATIONS

Non-Final Office Action, issued by the USPTO on Jul. 10, 2014 in connection with U.S. Appl. No. 13/326,110; 16 pp.

Non-Final Office Action; issued by the USPTO on Jun. 9, 2014 in connection with U.S. Appl. No. 13/326,132; 15 pp.

* cited by examiner

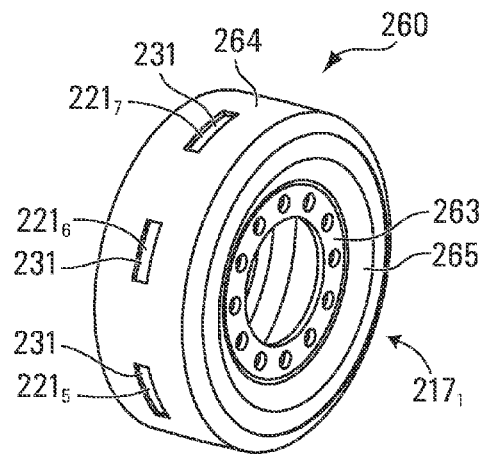
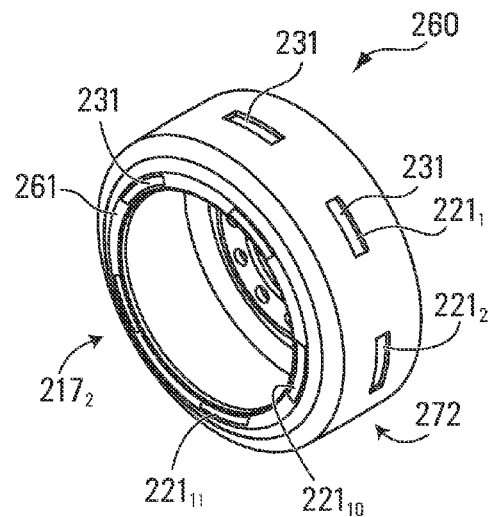
FIG. 25
FIG. 26
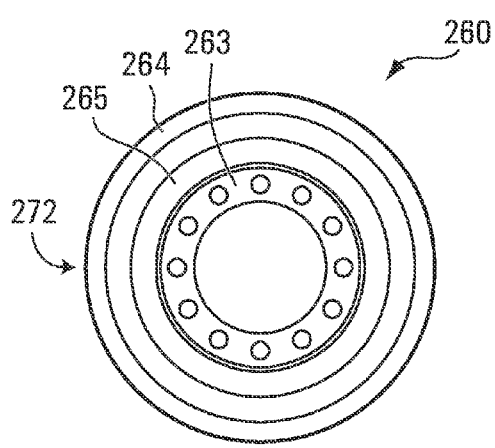
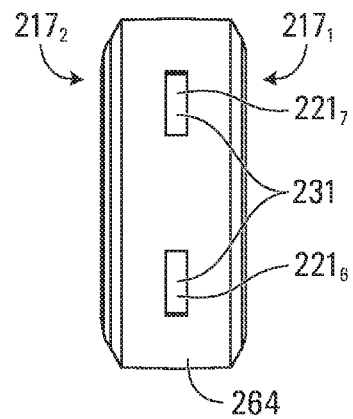
FIG. 27
FIG. 28

WHEEL OF A TRACK ASSEMBLY OF A TRACKED VEHICLE

CROSS-REFERENCE TO RELATED APPLICATIONS

This application claims the benefit under 35 USC 119(e) of U.S. Provisional Patent Application No. 61/359,938 filed on Jun. 30, 2010 and hereby incorporated by reference herein and of U.S. Provisional Patent Application No. 61/422,976 filed on Dec. 14, 2010 and hereby incorporated by reference herein.

FIELD OF THE INVENTION

The invention relates generally to track assemblies of tracked vehicles operable off-road and, more particularly, to wheels of such track assemblies.

BACKGROUND

Certain off-road vehicles, such as all-terrain vehicles (ATVs), snowmobiles, construction vehicles and agricultural vehicles to name a few, can be equipped with track assemblies comprising endless tracks that enhance their traction and floatation on soft, slippery, and/or uneven grounds (e.g., soil, mud, sand, ice, snow, etc.) on which they operate.

Typically, a track assembly of such a tracked vehicle comprises a plurality of wheels and an endless track disposed around these wheels. The wheels include a drive wheel to impart motion to the endless track and one or more idler wheels to support part of the vehicle's weight on the ground via the track, guide the track as it is driven by the drive wheel, and/or tension the track.

The wheels of a track assembly are often subject to loads, friction, etc., that can affect their performance, the performance of the endless track, and/or the performance of the track assembly as a whole.

For instance, an idler wheel of the track assembly may be a roller wheel that rolls on an inner side of the track along a bottom run of the track to apply the bottom run of track on the ground. Contact between the roller wheel and a rolling path of the track's inner side may create friction that generates some rolling resistance. Also, in some cases, the endless track's inner side may comprise a plurality of projections, sometimes referred to as "lugs", which are used to drive and/or guide the track and which may contact the roller wheel as the track is in motion. Contact between the roller wheel and a drive/guide lug creates friction that may be undesirable. For example, in some situations, such friction, if too great, may cause the roller wheel to climb on the drive/guide lug, possibly to a top of the drive/guide lug where the roller wheel may then fall on an opposite lateral side of the drive/guide lug such that the roller wheel is no longer on the rolling path, thereby negatively affecting operation of the track assembly if not render it inoperable altogether. As another example, in some situations, such friction, if too great, may lead to wear of the drive/guide lug and/or the roller wheel at an unacceptable rate. In some circumstances, the roller wheel may also be exposed to hard objects (e.g., rocks, metal pieces, etc.) lying on the ground which may impact and/or get stuck against the roller wheel and inflict abrasive damage. In some cases, the roller wheel may also be exposed to water, snow and/or ice in cold conditions that may cause ice formation on the roller wheel, particular when its surface has been worn so that it includes cracks or the like.

Problems similar to those arising in connection with roller wheels of a track assembly may sometimes also arise in connection with other wheels of the track assembly, such as a front or rear idler wheel or the drive wheel.

Such negative effects may be encountered in various types of tracked vehicles. For example, they may be encountered in ATVs or snowmobiles, which move at relatively high speeds that can worsen such negative effects. Such negative effects may also be encountered in work vehicles, such as agricultural vehicles, construction vehicles, etc., which move at relatively low speeds but bear loads that can worsen such negative effects.

Accordingly, there is a need for improving wheels of a track assembly of a tracked vehicle.

SUMMARY OF THE INVENTION

According to an aspect of the invention, there is provided a wheel for a track assembly of a tracked vehicle. The wheel in use is one of a plurality of wheels of the track assembly. The track assembly comprises an endless track disposed around the plurality of wheels. The endless track comprises an inner side for facing the plurality of wheels and a ground-engaging outer side for engaging the ground. The wheel comprises a wheel body comprising a hub portion, a rim portion, and a radially-extending portion between the hub portion and the rim portion. The wheel body comprises a wheel body material. The wheel also comprises a covering on the wheel body. The covering in use contacts the inner side of the endless track. The covering comprises a covering material different from the wheel body material. The wheel body and the covering are mechanically interlocked.

According to another aspect of the invention, there is provided a track assembly for providing traction to a tracked vehicle. The track assembly comprises a plurality of wheels and an endless track disposed around the plurality of wheels. The endless track comprises an inner side for facing the plurality of wheels and a ground-engaging outer side for engaging the ground. The plurality of wheels includes a drive wheel for driving the endless track. A given wheel of the plurality of wheels comprises a wheel body comprising a hub portion, a rim portion, and a radially-extending portion between the hub portion and the rim portion. The wheel body comprises a wheel body material. The given wheel also comprises a covering on the wheel body. The covering contacts the inner side of the endless track. The covering comprises a covering material different from the wheel body material. The wheel body and the covering are mechanically interlocked.

According to another aspect of the invention, there is provided a wheel for a track assembly of a tracked vehicle. The wheel in use is one of a plurality of wheels of the track assembly. The track assembly comprises an endless track disposed around the plurality of wheels. The endless track comprises an inner side for facing the plurality of wheels and a ground-engaging outer side for engaging the ground. The wheel comprises a wheel body comprising a hub portion, a rim portion, and a radially-extending portion between the hub portion and the rim portion. The wheel body comprises a first lateral side and a second lateral side opposite one another and a peripheral side between the first lateral side and the second lateral side. The wheel body comprises a wheel body material. The wheel also comprises a covering on the wheel body. The covering in use contacts the inner side of the endless track. The covering comprises a covering material different from the wheel body material. The covering comprises a peripheral portion covering at least part of the peripheral side of the wheel body and a lateral portion covering at least part of the first lateral side of the wheel body.

According to another aspect of the invention, there is provided a track assembly for providing traction to a tracked vehicle. The track assembly comprises a plurality of wheels and an endless track disposed around the plurality of wheels. The endless track comprises an inner side for facing the plurality of wheels and a ground-engaging outer side for engaging the ground. The plurality of wheels includes a drive wheel for driving the endless track. A given wheel of the plurality of wheels comprises a wheel body comprising a hub portion, a rim portion, and a radially-extending portion between the hub portion and the rim portion. The wheel body comprises a first lateral side and a second lateral side opposite one another and a peripheral side between the first lateral side and the second lateral side. The wheel body comprises a wheel body material. The given wheel also comprises a covering on the wheel body, the covering in use contacting the inner side of the endless track. The covering comprises a covering material different from the wheel body material. The covering comprises a peripheral portion covering at least part of the peripheral side of the wheel body and a lateral portion covering at least part of the first lateral side of the wheel body.

These and other aspects of the invention will now become apparent to those of ordinary skill in the art upon review of the following description of embodiments of the invention in conjunction with the accompanying drawings.

BRIEF DESCRIPTION OF THE DRAWINGS

A detailed description of embodiments of the invention is provided below, by way of example only, with reference to the accompanying drawings, in which:

FIGS. 25 to 28 respectively show a first perspective view, a second perspective view, a side view, and a front view of a wheel body of the wheel shown in FIGS. 20 to 23;

It is to be expressly understood that the description and drawings are only for the purpose of illustrating certain embodiments of the invention and are an aid for understanding. They are not intended to be a definition of the limits of the invention.

DETAILED DESCRIPTION OF EMBODIMENTS

Figure 1A:
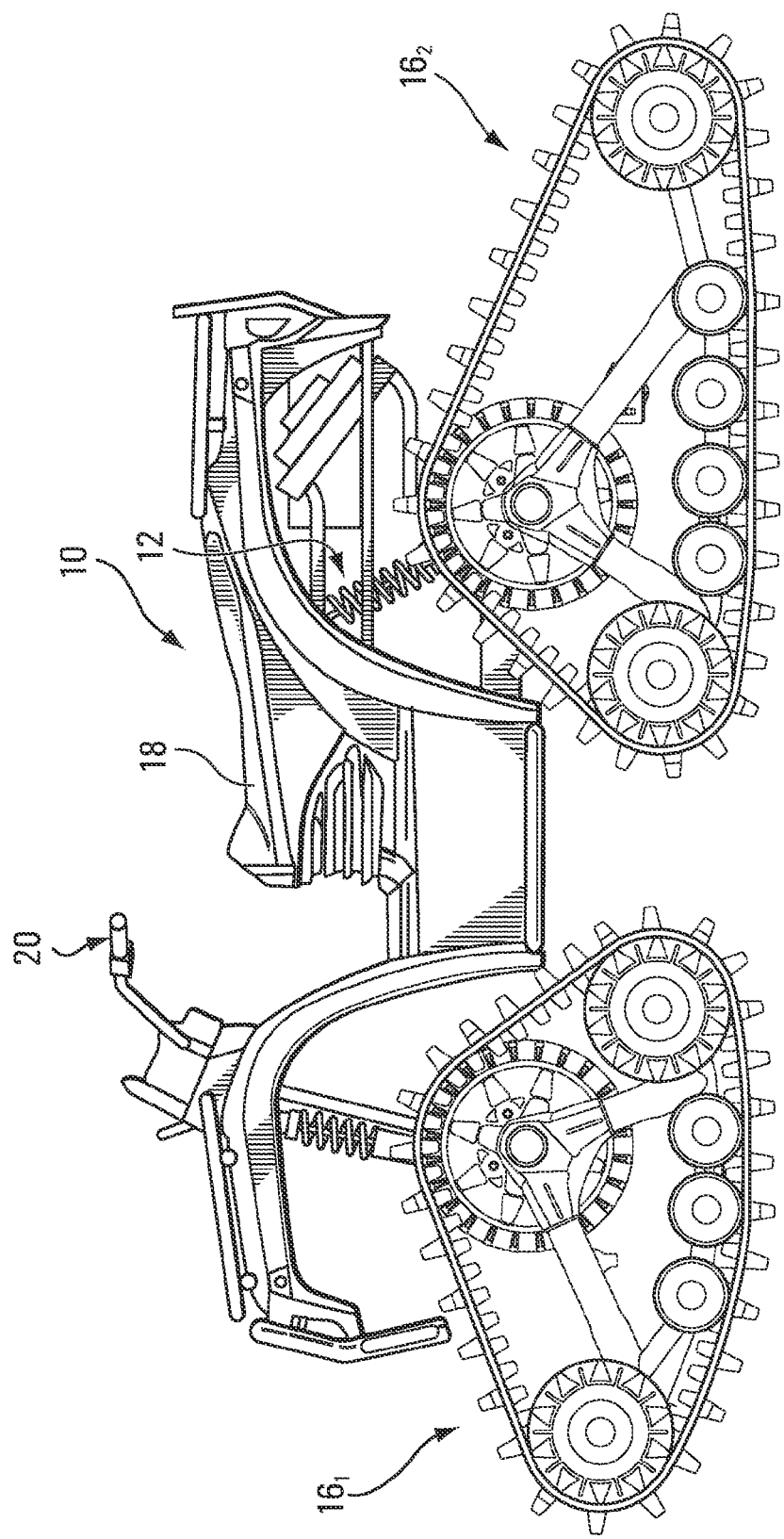
FIGS. 1A and 1B respectively show a side view and a top view of an example of a tracked vehicle comprising track assemblies in accordance with an embodiment of the invention.
Figure 1B:
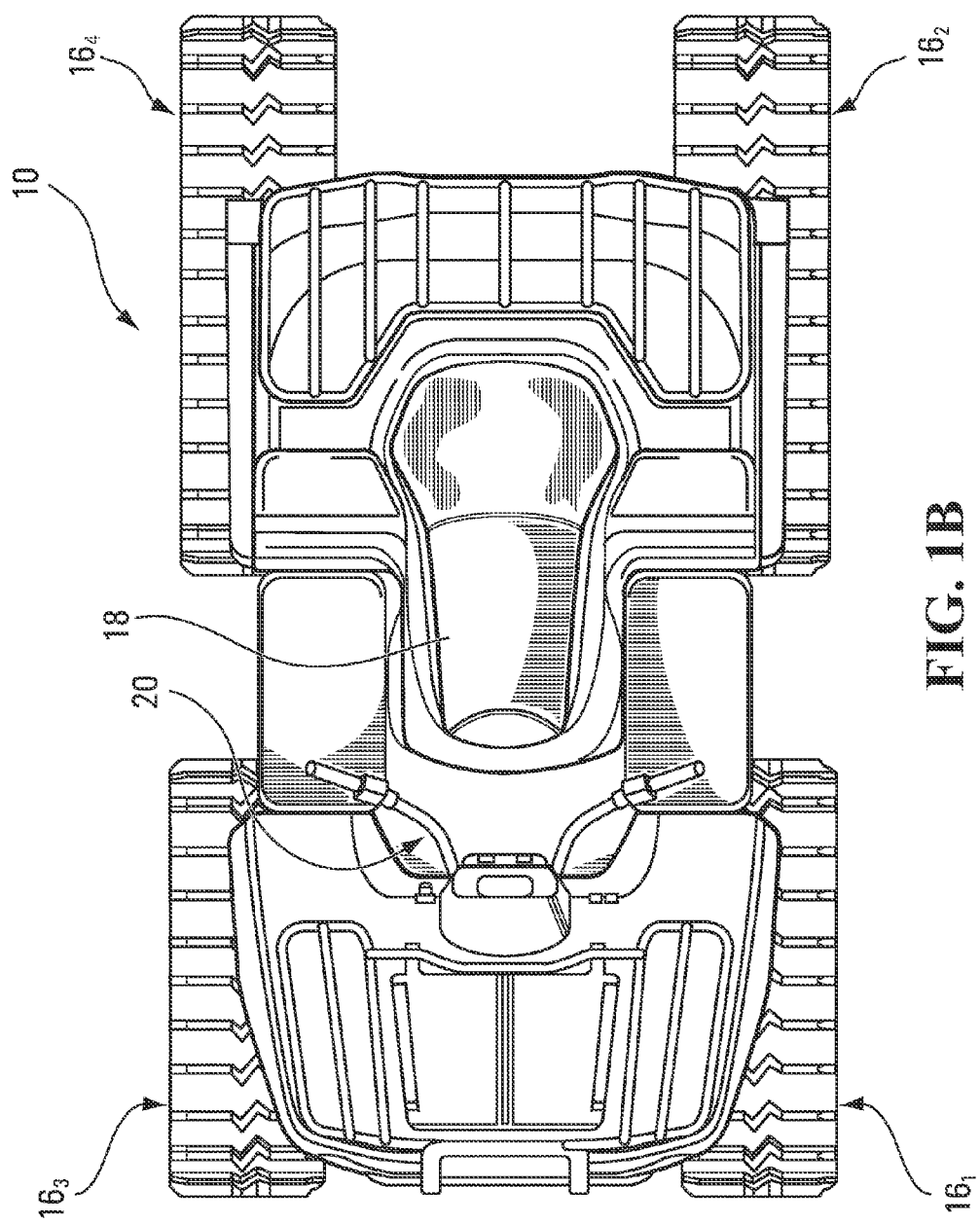

FIGS. 1A and 1B shows an example of an off-road tracked vehicle 10 in accordance with an embodiment of the invention. More specifically, in this embodiment, the tracked vehicle 10 is an all-terrain vehicle (ATV), which is a small open vehicle designed to travel off-road on a variety of terrains, including roadless rugged terrain, for recreational, utility and/or other purposes.

In this embodiment, the ATV 10 comprises a prime mover 12, a plurality of track assemblies 16$_1$-16$_4$, a seat 18, and a user interface 20, which enable a user of the ATV to ride the ATV 10 on the ground.

The prime mover 12 is a source of motive power that comprises one or more motors (e.g., an internal combustion engine, an electric motor, etc.). For example, in this embodiment, the prime mover 12 comprises an internal combustion engine. In other embodiments, the prime mover 12 may comprise another type of motor (e.g., an electric motor) or a combination of different types of motor (e.g., an internal combustion engine and an electric motor).

The prime mover 12 is in a driving relationship with at least some of the track assemblies 16$_1$-16$_4$. That is, motive power generated by the prime mover 12 is transmitted to at least some of the track assemblies 16$_1$-16$_2$ via a powertrain of the ATV 10 (e.g., via a transmission and a differential of the powertrain).

In this case, the seat 18 is a straddle seat and the ATV 10 is usable by a single person such that the seat 18 accommodates only that person driving the ATV 10. In other cases, the seat 18 may be another type of seat, and/or the ATV 10 may be usable by two individuals, namely one person driving the ATV 10 and a passenger, such that the seat 18 may accommodate both of these individuals (e.g., behind one another or side-by-side) or the ATV 10 may comprise an additional seat for the passenger.

The user interface 20 allows the user to interact with the ATV 10. More particularly, the user interface 20 comprises an accelerator, a brake control, and a steering device that are operated by the user to control motion of the ATV 10 on the ground. In this case, the steering device comprises handlebars, although it may comprise a steering wheel or other type of steering element in other cases. The user interface 20 also comprises an instrument panel (e.g., a dashboard) which provides indicators (e.g., a speedometer indicator, a tachometer indicator, etc.) to convey information to the user.

The track assemblies $16_1$-$16_4$ engage the ground to provide traction to the ATV 10. More particularly, in this example, front ones of the track assemblies $16_1$-$16_4$ provide front traction to the ATV 10 while rear ones of the track assemblies $16_1$-$16_4$ provide rear traction to the ATV 10. Each of the front ones of the track assemblies $16_1$-$16_4$ is pivotable in response to input of the user at the handlebars in order to steer the ATV 10 on the ground.

Figure 17A:
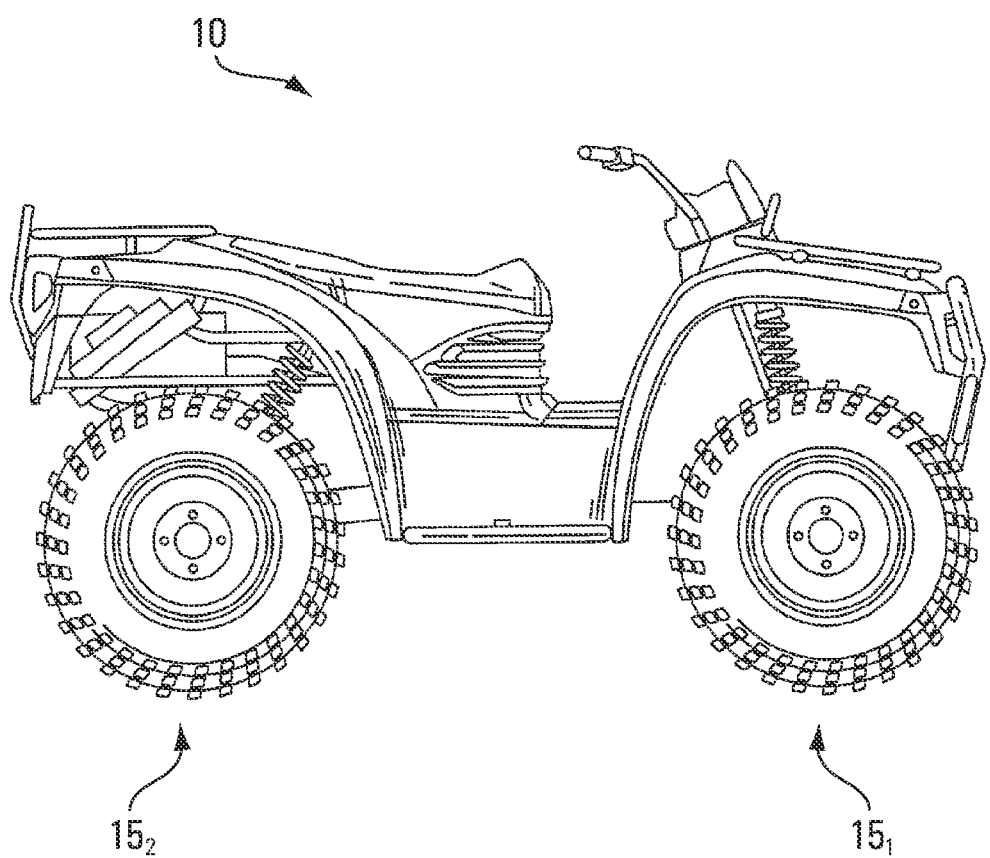
FIGS. 17A and 17B respectively show a side view and a top view of the vehicle with ground-engaging wheels mounted in place of the track assemblies.
Figure 17B:
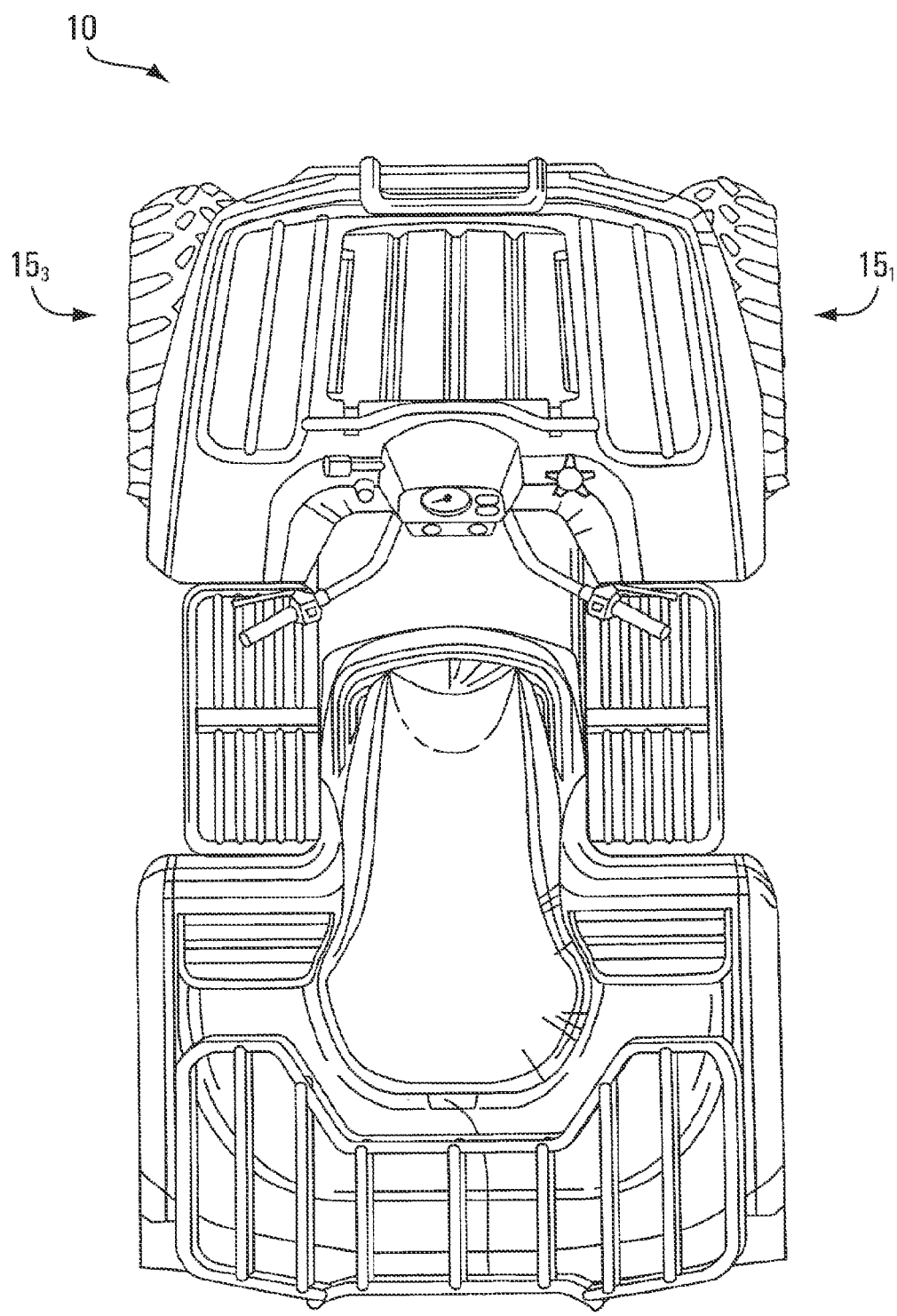

In this embodiment, each of the track assemblies $16_1$-$16_4$ is mounted in place of a ground-engaging wheel that may otherwise be mounted at a position of that track assembly to propel the ATV 10 on the ground. For example, as shown in FIGS. 17A and 17B, the ATV 10 may be propelled on the ground by four ground-engaging wheels $15_1$-$15_4$ instead of the track assemblies $16_1$-$16_4$. For instance, each ground-engaging wheel $15_i$ may comprise a pneumatic tire. Basically, in this embodiment, the track assemblies $16_1$-$16_4$ may be used to convert the ATV 10 from a wheeled vehicle into a tracked vehicle, thereby enhancing its traction and floatation on the ground.

Figure 2:
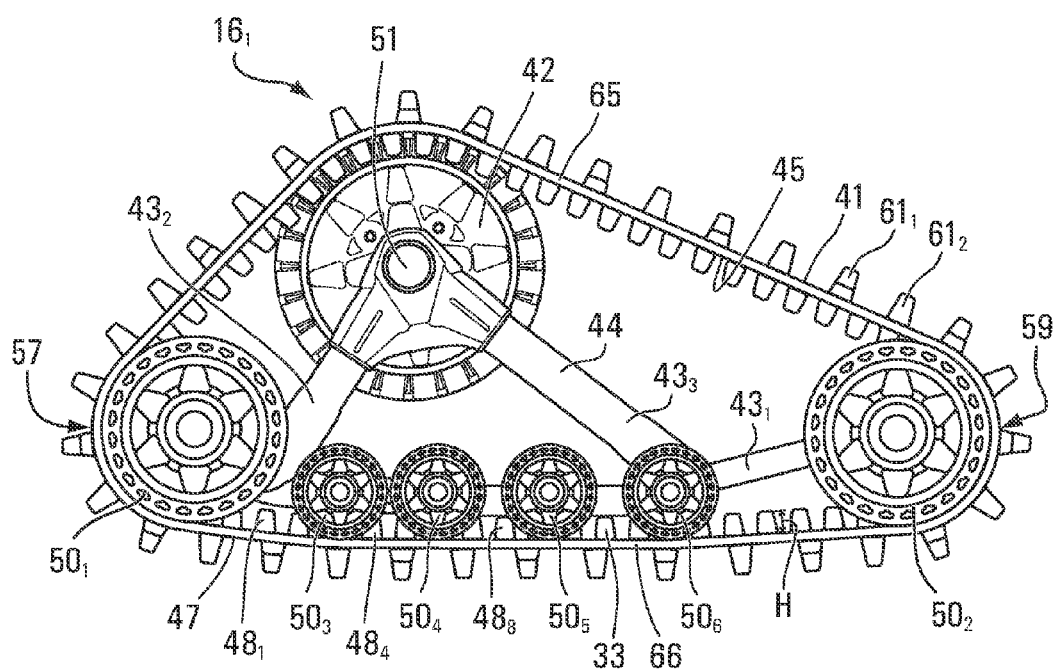
FIG. 2 shows a side view of a track assembly of the tracked vehicle of FIG. 1.
Figure 3:
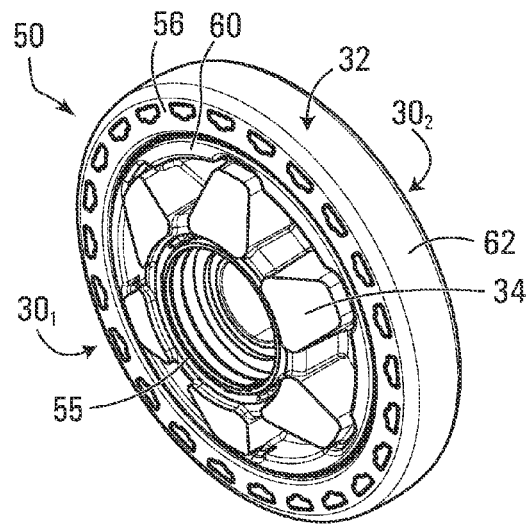
FIGS. 3 to 6 respectively show a perspective view, a side view, a front view and a top view of a wheel of the track assembly.
Figure 4:
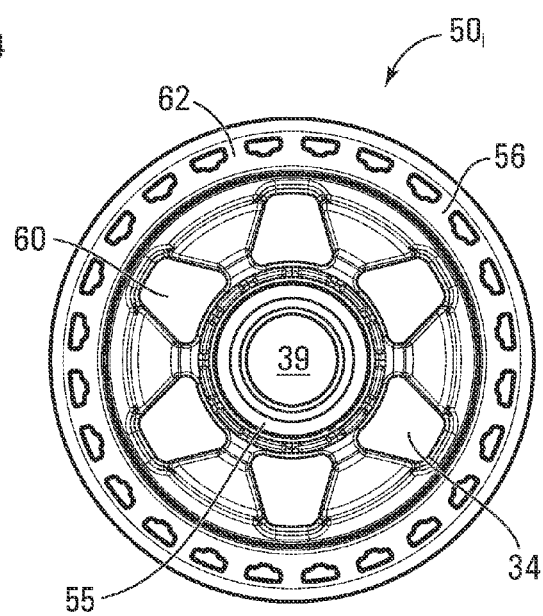
Figure 5:
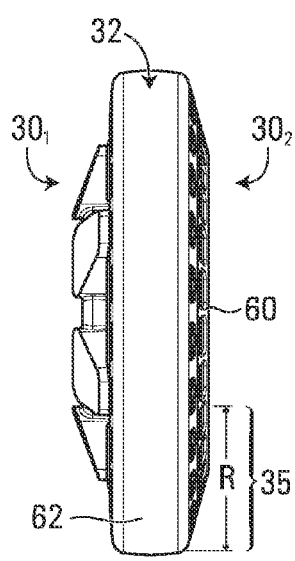
Figure 6:
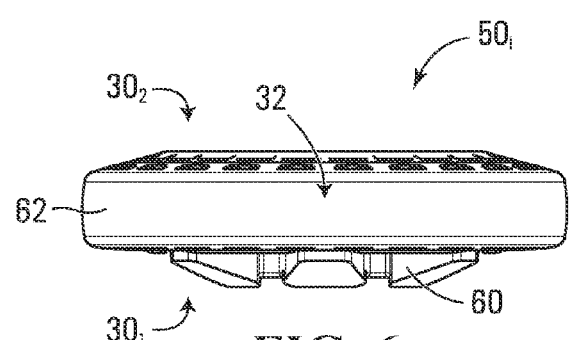
Figure 7:
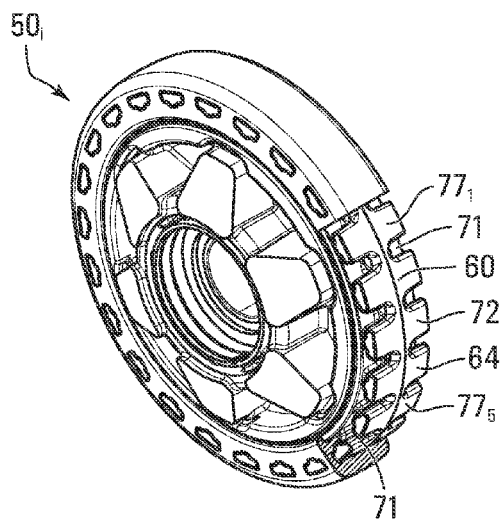
FIGS. 7 to 10 respectively show a perspective view, a side view, a front view and a top view of the wheel of the track assembly with a portion of a covering of the wheel removed.
Figure 8:
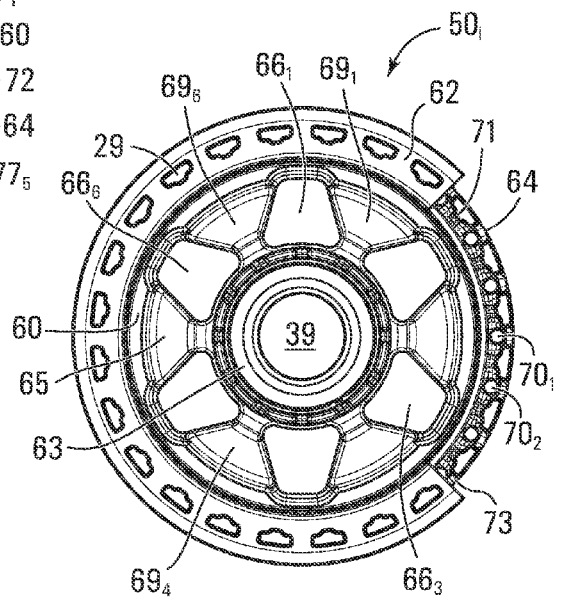
Figure 9:
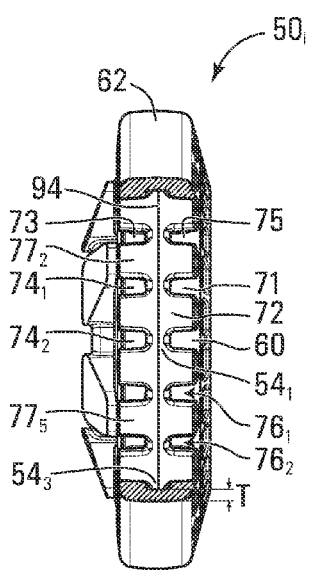
Figure 10:
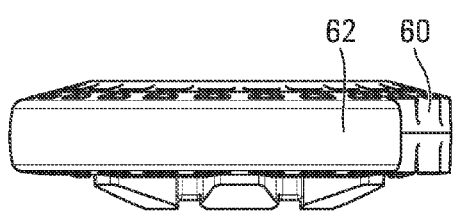
Figure 11:
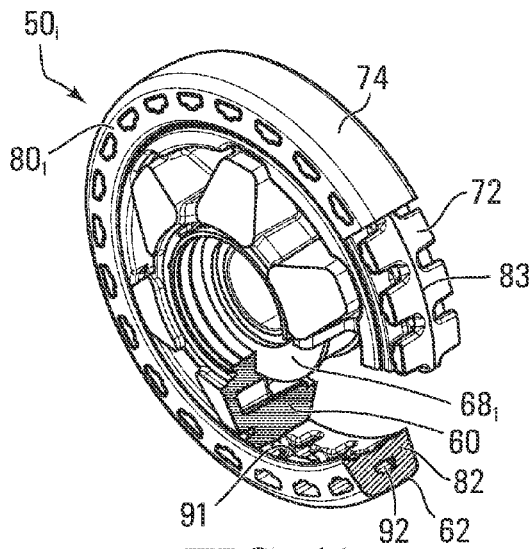
FIGS. 11 to 14 respectively show a perspective view, a side view, a front view and a top view of the wheel of the track assembly with a portion of the covering of the wheel removed and a portion of a wheel body of the wheel removed.
Figure 12:
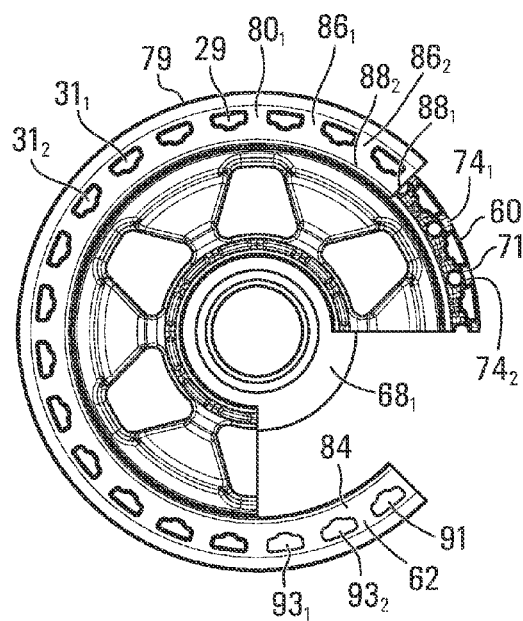
Figure 13:
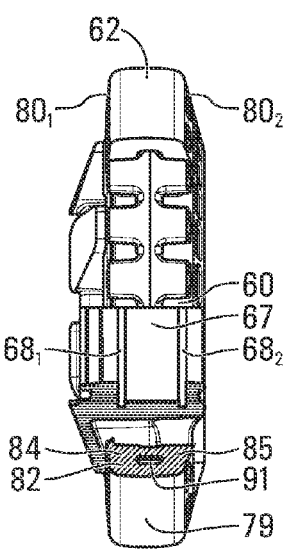
Figure 14:
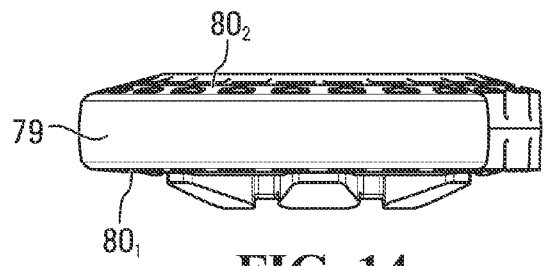

With additional reference to FIG. 2, in this embodiment, each track assembly $16_i$ comprises a frame 44, a plurality of wheels which includes a drive wheel 42 and a plurality of idler wheels $50_1$-$50_{12}$, and an endless track 41 disposed around these wheels. The track assembly $16_i$ has a first longitudinal end 57 and a second longitudinal end 59 that define a length of the track assembly $16_i$. A width of the track assembly $16_i$ is defined by a width of the endless track 41. The track assembly $16_i$ has a longitudinal direction, transversal directions including a widthwise direction, and a height direction.

The endless track 41 engages the ground to provide traction to the ATV 10. The track 41 has an inner side 45 facing the wheels 42, $50_1$-$50_{12}$ and defining an inner area of the track 41 in which these wheels are located. The track 41 also has a ground-engaging outer side 47 opposite the inner side 45 and engaging the ground on which the ATV 10 travels. The endless track 41 has a top run 65 which extends between the longitudinal ends 57, 59 of the track assembly $16_i$ and over the drive wheel 42, and a bottom run 66 which extends between the longitudinal ends 57, 59 of the track assembly $16_i$ and under the idler wheels $50_1$-$50_{12}$.

In this embodiment, the inner side 45 of the endless track 41 comprises a plurality of wheel-contacting projections $48_1$-$48_N$ that contact at least some of the wheels 42, $50_1$-$50_{12}$ and that are used to do at least one of driving (i.e., imparting motion to) the track 41 and guiding the track 41. Since each of the drive/guide projections $48_1$-$48_N$ is used to do at least one of driving the track 41 and guiding the track 41, it can be referred to as "drive/guide projection". Also, such drive/guide projections are sometimes referred to as "drive/guide lugs" and will thus be referred to as such herein. More particularly, in this embodiment, the drive/guide lugs $48_1$-$48_N$ interact with the drive wheel 42 in order to cause the track 41 to be driven, and also interact with the idler wheels $50_1$-$50_{12}$ in order to guide the track 41 as it is driven by the drive wheel 42. The drive/guide lugs $48_1$-$48_N$ are thus used to both drive the track 41 and guide the track 41 in this embodiment.

The drive/guide lugs $48_1$-$48_N$ are spaced apart along the longitudinal direction of the track assembly $16_i$. In this case, the drive/guide lugs $48_1$-$48_N$ are arranged in a plurality of rows that are spaced apart along the widthwise direction of the track assembly $16_i$. The drive/guide lugs $48_1$-$48_N$ may be arranged in other manners in other embodiments.

The ground-engaging outer side 47 comprises a plurality of traction projections $61_1$-$61_M$ (sometimes referred to as "traction lugs" or "traction profiles") that are spaced apart along the longitudinal direction of the track assembly $16_i$ and engage the ground to enhance traction.

In this embodiment, the endless track 41 comprises an elastomeric body underlying its inner side 45 and its ground-engaging outer side 27. The body 36 is elastomeric in that it comprises elastomeric material which allows the track 41 to elastically change in shape as it is in motion around the wheels 42, $50_1$-$50_{12}$. The elastomeric material can be any polymeric material with suitable elasticity. In this embodiment, the elastomeric material includes rubber. Various rubber compounds may be used and, in some cases, different rubber compounds may be present in different areas of the track 41. In other embodiments, the elastomeric material may include another elastomer in addition to or instead of rubber (e.g., polyurethane elastomer). Also, in this embodiment, the track 41 comprises one or more reinforcements embedded in the elastomeric material (e.g., a layer of reinforcing longitudinal cables and/or a layer of reinforcing fabric).

The endless track 41 may be constructed in various other manners in other embodiments. For example, in some embodiments, the track 41 may comprise a plurality of parts (e.g., rubber sections) interconnected to one another to form an endless belt, the track 41 may have recesses or holes that interact with the drive wheel 42 in order to cause the track 41 to be driven (e.g., in which case the drive/guide lugs $48_1$-$48_N$ may be used only to guide the track 41 without being used to drive the track 41), and/or the ground-engaging outer side 47 of the track 41 may comprise various other patterns of traction projections.

The drive wheel 42 is rotatable about an axle 49 of the ATV 10 for driving the track 41. That is, power generated by the prime mover 12 and delivered over the powertrain of the ATV 10 can rotate the axle 49, which rotates the drive wheel 42, which imparts motion of the track 41. In this embodiment, since the track assemblies $16_1$-$16_4$ are mounted in place of the ground-engaging wheels $15_1$-$15_4$ with which the ATV 10 can be equipped, the axle 49 of the ATV 10 is capable of rotating the drive wheel 42 of the track assembly $16_i$ or a ground-engaging wheel $15_i$ of the ATV 10.

In this embodiment, the drive wheel 42 comprises a drive sprocket engaging the drive/guide lugs $48_1$-$48_N$ of the inner side 45 of the track 41 in order to drive the track 41. In other embodiments, the drive wheel 42 may be configured in various other ways. For example, in embodiments where the track 41 comprises recesses or holes, the drive wheel 42 may have teeth that enter these recesses or holes in order to drive the track 41. As yet another example, in some embodiments, the drive wheel 42 may frictionally engage the inner side 45 of the track 41 in order to frictionally drive the track 41.

The frame 44 supports various components of the track assembly $16_i$, including the idler wheels $50_1$-$50_{12}$. More particularly, in this embodiment, the frame 44 comprises three (3) frame elements $43_1$-$43_3$ defining a generally triangular shape. Each of the idler wheels $50_1$-$50_{12}$ is mounted to the frame element $43_1$. Specifically, the idler wheels $50_1$, $50_2$ are mounted to the frame element $43_1$ in a front longitudinal end region of the track assembly $16_i$, the idler wheels $50_{11}$, $50_{12}$ are mounted to the frame element $43_1$ in a rear longitudinal end region of the track assembly $16_i$, and the idler wheels $50_3$-$50_{10}$ are mounted to the frame element $43_1$ in a bottom region of the track assembly $16_i$ between the idler wheels $50_1$, $50_2$ and the idler wheels $50_{11}$, $50_{12}$. Each of the idler wheels $50_3$-$50_{10}$ may be directly rotatably mounted to the frame element $43_1$ or may be rotatably mounted to a link which is rotatably mounted to the frame element $43_1$ and to which is rotatably mounted an adjacent one of the idler wheels $50_3$-$50_{10}$, thus forming a "tandem". The frame 44 may be configured in various other ways in other embodiments.

In this embodiment, the frame 44 is pivotable about a pivot point 51 to facilitate motion of the track assembly $16_i$ on uneven terrain and enhance its traction on the ground. More specifically, in this case, the pivot point 51 corresponds to the axle 49 to which the drive wheel 42 is mounted. The frame 44 is pivotally connected at the pivot point 51 by the frame elements $43_2$, $43_3$ that converge towards this point. In this way, the frame 44, and thus the track assembly $16_i$, can pivot about the pivot point 51 to deal with uneven terrain the ATV 10 may traverse.

The idler wheels $50_1$-$50_{12}$ are not driven by power supplied by the prime mover 12, but are rather used to do at least one of supporting part of the weight of the ATV 10 on the ground via the track 41, guiding the track 41 as it is driven by the drive wheel 42, and tensioning the track 41.

More particularly, in this embodiment, the idler wheels $50_1$, $50_2$ are front idler wheels (leading idler wheels) that maintain the track 41 in tension, and can help to support part of the weight of the ATV 10 on the ground via the track 41. Similarly, the idler wheels $50_{11}$, $50_{12}$ are rear idler wheels (trailing idler wheels) that maintain the track 41 in tension, and can help to support part of the weight of the ATV 10 on the ground via the track 41. The idler wheels $50_3$-$50_{10}$ are roller wheels that roll on the inner side 45 of the track 41 along the bottom run 66 of the track 41 to apply the bottom run 66 on the ground. The idler wheels $50_1$-$50_{12}$ may be arranged in other configurations and/or the track assembly $16_i$ may comprise more or less idler wheels in other embodiments.

With additional reference to FIGS. 3 to 14, each roller wheel $50_i$ comprises a hub portion 55, a rim portion 56, and a radially-extending portion 34 between the hub portion 55 and the rim portion 56. The hub portion 55 is an inner portion of the roller wheel $50_i$ which defines an opening 39 for an axle 58 of the roller wheel $50_i$. The rim portion 56 is an outer portion of the roller wheel $50_i$ which contacts the inner side 45 of the endless track 41. The radially-extending portion 34 is an intermediate portion of the roller wheel $50_i$ which extends radially between the hub portion 55 and the rim portion 56.

The roller wheel $50_i$ comprises a pair of lateral sides $30_1$, $30_2$ opposite one another and a peripheral side 32 between the lateral sides $30_1$, $30_2$. The peripheral side 32 rolls on the inner side 45 of the track 41 to apply the bottom run 66 of track 41 on the ground. More particularly, in this embodiment, the inner side 45 of the track 41 comprises a rolling path 33 on which the roller wheel $50_i$ rolls. The rolling path 33 is delimited by some of the drive/guide lugs $48_1$-$48_N$ such that, as the roller wheel $50_i$ rolls, these drive/guide lugs pass next to the roller wheel $50_i$.

The roller wheel $50_i$ may contact a drive/guide lug $48_i$ of the endless track 41 adjacent to it during motion of the track 41. More particularly, in this embodiment, the lateral side $30_2$ of the roller wheel $50_i$, which faces the drive/guide lug $48_i$, comprises a projection-contacting portion 35 that can contact the drive/guide lug $48_i$ when the roller wheel $50_i$ contacts the drive/guide lug $48_i$ as the drive/guide lug $48_i$ passes next to the roller wheel $50_i$. The projection-contacting portion 35, which will be referred to as a "lug-contacting portion", has a shape that depends on respective shapes of the roller wheel $50_i$ and the drive/guide lug $48_i$, but generally has a radial dimension R no greater than a height H of the drive/guide lug $48_i$.

In this embodiment, the roller wheel $50_i$ comprises a wheel body 60 and a covering 62 on the wheel body 60. As further discussed below, the covering 62 may improve the performance of the roller wheel $50_i$, for example, by reducing friction between the roller wheel $50_i$ and the inner side 45 of the endless track 41, by enhancing an abrasion resistance of the roller wheel $50_i$, and/or by absorbing vibrations as the ATV 10 travels on the ground.

The wheel body 60 is a core of the roller wheel $50_i$ that imparts structural integrity to the roller wheel $50_i$. The wheel body 60 comprises a pair of lateral sides $17_1$, $17_2$ opposite one another and a peripheral side 72 between the lateral sides $17_1$, $17_2$. In this case, the lateral sides $17_1$, $17_2$ of the wheel body 60 form part of the lateral sides $30_1$, $30_2$ of the roller wheel $50_i$, while the peripheral side 72 of the body 60 is covered by the covering 62.

The wheel body 60 comprises a hub portion 63, a rim portion 64, and a radially-extending portion 65 between the hub portion 63 and the rim portion 64.

The hub portion 63 of the wheel body 60 constitutes the hub portion 55 of the roller wheel $50_i$. The hub portion 63 thus defines the opening 39 for the axle 58 of the roller wheel $50_i$. In this embodiment, the hub portion 63 comprises a bearing 67 and a pair of washers $68_1$, $68_2$. More particularly, in this embodiment, some material of the wheel body 60 is overmolded over the bearing 67 and the washers $68_1$, $68_2$ to retain them. The hub portion 63 may be configured in various other ways in other embodiments (e.g., the bearing 67 and the washers $68_1$, $68_2$ may not be retained by overmolding; the hub portion 63 may not comprise any bearing and/or any washer; etc).

The rim portion 64 of the wheel body 60 is part of the rim portion 56 of the roller wheel $50_i$. The rim portion 64 comprises the peripheral side 72 of the wheel body 60. Also, in this embodiment, the rim portion 64 comprises a hollow space 71 which is occupied the covering 62. More particularly, in this embodiment, the hollow space 71 comprises a recess 73 extending circumferentially along the roller wheel $50_i$ on the lateral side $30_1$, a recess 75 extending circumferentially along the roller wheel $50_i$ on the lateral side $30_2$, a plurality of holes $70_1$-$70_R$ distributed circumferentially along the roller wheel $50_i$, a plurality of recesses $74_1$-$74_P$ distributed circumferentially along the roller wheel $50_i$ on the lateral side $30_1$, and a plurality of recesses $76_1$-$76_P$ distributed circumferentially along the roller wheel $50_i$ on the lateral side $30_2$. The recesses $74_1$-$74_P$ form a plurality of ribs $77_1$-$77_Q$ distributed circumferentially along the roller wheel $50_i$. The rim portion 64 may be configured in various other ways in other embodiments (e.g., the hollow space 71 may have a different configuration; the rim portion 64 may not comprise any hollow space; the peripheral side 72 may not be covered by the covering 62; etc.).

The radially-extending portion 65 of the wheel body 60 constitutes the radially-extending portion 34 of the roller wheel $50_i$. The radially-extending portion 65 interconnects the hub portion 63 and the rim portion 64. In this embodiment, the radially-extending portion 65 comprises a plurality of spoke-like members $66_1$-$66_6$ distributed circumferentially along the roller wheel $50_i$ and a plurality of openings $69_1$-$69_6$ between these spoke-like members. The radially-extending portion 65 may be configured in various other ways in other embodiments (e.g., the spoke-like members $66_1$-$66_6$ may have different shapes; the radially-extending portion 65 may comprise a different number of spoke-like members or no spoke-like member at all; etc.).

The wheel body 60 comprises at least one material, referred to as "wheel body material", making up the wheel body 60. That is, the wheel body 60 is made of one or more wheel body materials. In some cases, the wheel body 60 may include a single wheel body material making up an entirety of the wheel body 60. In other cases, the wheel body 60 may include two or more wheel body materials that make up different parts of the wheel body 60.

In this embodiment, the wheel body 60, except for the bearing 67 and the washers 68$_1$, 68$_2$, is made of a single wheel body material. More particularly, in this embodiment, the wheel body material is a polymeric material. This polymeric material may be selected to provide strength and rigidity to the roller wheel 50$_i$. For example, in this case, the wheel body material is polyethylene, and more specifically ultra-high-molecular-weight polyethylene (UHMWPE). In other cases, the wheel body material may be another polymeric material. In other embodiments, the wheel body material may be another type of material (e.g., a composite material, a metallic material, a ceramic material, etc.). Also, in other embodiments, different parts of the wheel body 60 may be made of two or more wheel body materials (e.g., two types of polymers).

The covering 62 contacts the inner side 45 of the endless track 41 as the roller wheel 50$_i$ rolls on the inner side 45 of the track 41. In this embodiment, the covering 62 forms at least part of the peripheral side 32 and at least part of each of the lateral sides 30$_1$, 30$_2$ of the roller wheel 50$_i$. More particularly, in this embodiment, the covering 62 comprises a peripheral portion 79 that forms the peripheral side 32 of the roller wheel 50$_i$ and lateral portions 80$_1$, 80$_2$ that respectively form part of the lateral sides 30$_1$, 30$_2$ of the roller wheel 50$_i$. Thus, in this case, the covering 62 is part of the rim portion 56 of the roller wheel 50$_i$.

The covering 62 covers at least part of the wheel body 60 of the roller wheel 50$_i$. In this embodiment, the covering 62 covers part of the rim portion 64 of the wheel body 60. More particularly, in this embodiment, the covering 62 covers the peripheral side 72 and parts of the lateral sides 17$_1$, 17$_2$ of the wheel body 60 that are in the rim portion 64 of the wheel body 60.

The covering 62 has a thickness $T_C$ over the rim portion 64 of the wheel body 60. For example, in some embodiments, the thickness $T_C$ of the covering 62 may be at least 1 mm, in some cases at least 3 mm, in some cases at least 5 mm, and in some cases even more (e.g., 8, 10, 12 or 15 mm in some cases). The thickness $T_C$ of the covering 62 may take on various other values in other embodiments.

In this embodiment, the covering 62 comprises a hollow space 91 which is occupied by the wheel body 60. More particularly, in this embodiment, the hollow space 91 comprises a hole 92 extending circumferentially along the roller wheel 50$_i$ and a plurality of holes 93$_1$-93$_Q$ distributed circumferentially along the roller wheel 50$_i$. The holes 93$_1$-93$_Q$ extend transversally to the hole 92 and accommodate the ribs 78$_1$-78$_Q$ of the wheel body 60. In other embodiments, the hollow space 91 may have a different configuration or the covering 62 may not comprise any hollow space.

The covering 62 comprises at least one material, referred to as "covering material", making up the covering 62. That is, the covering 62 is made of one or more covering materials. In some cases, the covering 62 may include a single covering material making up an entirety of the covering 62. In other cases, the covering 62 may include two or more covering materials that make up different parts of the covering 62.

In this embodiment, the covering 62 is made of a single covering material. The covering material is different from the wheel body material. For example, the covering material and the wheel body material may belong to different classes of materials (i.e., metals, polymers, ceramics and composites) and/or may substantially differ in terms of one or more properties, such as strength, elasticity, hardness, friction coefficient, etc. For instance, in some cases: a strength (e.g., yield strength) of the wheel body material may be different from (e.g., greater than) a strength of the covering material; a modulus of elasticity of the covering material may be different from (e.g., less than) a modulus of elasticity of the wheel body material; a hardness of the covering material may be different from (e.g., less than) a hardness of the wheel body material; an abrasion resistance of the covering material may be different from (e.g., greater than) an abrasion resistance of the wheel body material; a coefficient of friction of the covering material with the track 41 may be different from (e.g., less than) a coefficient of friction of the wheel body material with the track; etc.

More particularly, in this embodiment, the covering material is a polymeric material. This polymeric material may be selected, for instance, to create a low-friction interface between the roller wheel 50$_i$ and the inner side 45 of the endless track 41, to enhance an abrasion resistance of the roller wheel 50$_i$, and/or to enhance a vibration absorption capacity of the roller wheel 50$_i$. Alternatively or additionally, the polymeric material may be selected to reduce the potential for formation of cracks or the like as the roller wheel 50$_i$ wears. Avoiding or limiting such crack formation may counter a tendency for ice formation if the roller wheel 50$_i$ is exposed to water, snow and/or ice in cold conditions.

In this example of implementation, the polymeric covering material of the covering 62 is an elastomeric material. For example, in this case, the elastomeric material is a polyurethane elastomer. In other cases, the elastomeric material may be another elastomer instead of polyurethane (e.g., rubber). In other examples of implementation, the polymeric covering material may be another type of polymer which may or may not be elastomeric.

In other embodiments, the covering material of the covering 62 may be another type of material (e.g., a composite material, a metallic material, a ceramic material, etc.). Also, in other embodiments, different parts of the covering 62 may be made of two or more covering materials (e.g., two types of polymers).

In this example, the covering material has a coefficient of friction $\mu_C$ with the inner side 45 of the endless track 41 which can reduce friction between the roller wheel 50$_i$ and the inner side 45 of the track 41. The peripheral portion 79 of the covering 62 thus reduces the rolling resistance of the roller wheel 50$_i$ on the rolling path 33 of the inner side 45 of the track 41. Also, the lateral portion 80$_2$ of the covering 62 reduces friction between the roller wheel 50$_i$ and a drive/guide lug 48$_i$ which may be contacted by the lug-contacting portion 35 as the drive/guide lug 48$_i$ passes next to the roller wheel 50$_i$. This may reduce a tendency of the roller wheel 50$_i$ to "climb" on the drive/guide lug 48$_i$, possibly to a top of the drive/guide lug 48$_i$ where the roller wheel 50$_i$ could fall on an opposite lateral side of the drive/guide lug 48$_i$ such that the roller wheel 50$_i$ would no longer be on the rolling path 33. The covering 62 is thus a friction reducer which creates an anti-friction area where the roller wheel 50$_i$ contacts the inner side 45 of the track 41.

In addition to the lateral portion 80$_2$ of the covering 62, in this embodiment, the lug-contacting portion 35 of the lateral side 30$_2$ of the roller wheel 50$_i$ also comprises a lateral portion 29 of the wheel body 60 that can contact a drive/guide lug 48$_i$. In this example, the lateral portion 29 of the wheel body 60 comprises a plurality of lateral parts 31$_1$-31$_Q$, which in this case correspond to lateral surfaces of the ribs 77$_1$-77$_Q$ and which are spaced apart circumferentially by respective parts of the lateral portion $80_2$ of the covering 62. The wheel body material has a coefficient of friction $\mu_B$ with the inner side 45 of the endless track 41. The coefficient of friction $\mu_C$ of the covering material and the coefficient of friction $\mu_B$ of the wheel body material may be different. For example, in this embodiment, the coefficient of friction $\mu_C$ of the covering material may be less than the coefficient of friction $\mu_B$ of the body material. For instance, in some cases, a ratio $\mu_C/\mu_B$ of the coefficient of friction $\mu_C$ of the covering material to the coefficient of friction $\mu_B$ of the body material may be no more than 0.90, no more than 0.85, no more than 0.80, or no more than 0.75. The ratio $\mu_C/\mu_B$ may take on various other values in other cases. In other embodiments, the coefficient of friction $\mu_C$ of the covering material may be greater than the coefficient of friction $\mu_B$ of the body material.

The covering 62 and the wheel body 60 of the roller wheel $50_i$ may be interconnected in various ways. In this embodiment, the covering 62 and the body 60 are mechanically interlocked. That is, the covering 62 and the wheel body 60 are in a mechanical interlock relationship in which they are interconnected via a given one of the wheel body 60 and the covering 62 extending into the other one of the wheel body 60 and the covering 62. More specifically, a first one of the wheel body 60 and the covering 62 comprises an interlocking space into which extends an interlocking portion of a second one of the wheel body 60 and the covering 62. The interlocking space may comprise one or more holes, one or more recesses, and/or one or more other hollow areas. This mechanical interlock relationship restrains movement of the covering 62 relative to the wheel body 60. In some cases, the mechanical interlock relationship restrains all degrees of freedom of movement of the covering 62 relative to the wheel body 60. In other cases, the mechanical interlock relationship restrains some but not all of the degrees of freedom of movement of the covering 62 relative to the wheel body 60.

More particularly, in this embodiment, the hollow space 71 of the wheel body 60 constitutes an interlocking space into which extends an interlocking part 82 of the covering 62 that occupies the hollow space 71 of the wheel body 60. The interlocking part 82 of the covering 62 occupies the recesses 73, 75, $74_1$-$74_P$, $76_1$-$76_P$ and the holes $70_1$-$70_R$ of the hollow space 71 of the wheel body 60. More specifically, in this case, the interlocking part 82 of the covering 62 comprises a recess-occupying portion 84 which occupies the recess 73 of the wheel body 60, a recess-occupying portion 85 which occupies the recess 75 of the wheel body 60, a plurality of recess-occupying portions $86_1$-$86_P$ which occupy the recesses $74_1$-$74_P$ of the wheel body 60, a plurality of recess-occupying portions $87_1$-$87_P$ which occupy the recesses $76_1$-$76_P$ of the wheel body 60, and a plurality of hole-occupying portions $88_1$-$88_R$ which occupy the holes $70_1$-$70_R$ of the wheel body 60.

Also, in this embodiment, the hollow space 91 of the covering 62 constitutes an interlocking space into which extends an interlocking part 83 of the wheel body 60 that occupies the hollow space 91 of the covering 62. The interlocking part 83 of the wheel body 60 occupies the holes 92, $93_1$-$93_Q$ of the hollow space 91 of the covering 62. More specifically, in this case, the interlocking part 83 of the wheel body 60 comprises a hole-occupying portion 94 which occupies the hole 92 of the covering 62 and a plurality of hole-occupying portions, namely the ribs $77_1$-$77_Q$, which occupy the holes $93_1$-$93_Q$ of the covering 62.

The mechanical interlock relationship is created during manufacturing of the roller wheel $50_i$. In this embodiment, the mechanical interlock relationship is created during molding of the roller wheel $50_i$. More particularly, in this embodiment, the wheel body 60 is molded and then the covering 62 is overmolded on the wheel body 60. During overmolding of the covering 62, the covering material flows into the hollow space 71 of the wheel body 60 where it is captured so as to create the mechanical interlock. In particular, in this embodiment, the covering material flows through the holes $70_1$-$70_R$ of the wheel body 60 so as to surround each of a plurality of neck portions $54_1$-$54_R$ located between adjacent ones of the ribs $77_1$-$77_Q$.

In this embodiment, the mechanical interlock implemented by the covering 62 and the wheel body 60 is such that they are interconnected without requiring a chemical bond between the covering 62 and the wheel body 60 and without requiring an adhesive bond between the covering 62 and the wheel body 60. Indeed, in this embodiment, there is no chemical bond and no adhesive bond between the covering 62 and the wheel body 60.

This interconnection of the covering 62 and the wheel body 60 without requiring an adhesive nor a chemical bond between the covering 62 and the wheel body 60 allows more freedom in selecting the covering material and the wheel body material. For example, in some embodiments, the covering material and the wheel body material may be incompatible such that they are not chemically bonded when the covering 62 is overmolded on the wheel body 60. As another example, in some embodiments, the covering material and the wheel body material may be incapable of being adhesively bonded by an adhesive. In other embodiments, the covering material and the wheel body material may be compatible such that they are chemically bonded when the covering 62 is molded on the wheel body 60 and/or may be capable of being adhesively bonded by an adhesive.

Although the roller wheel $50_i$ is configured in a particular way in this embodiment, the roller wheel $50_i$ may be configured in various other ways in other embodiments.

For example, in other embodiments, the covering 62 may form a different part of the peripheral side 32 of the roller wheel $50_i$, a different part of the lateral side $30_1$ of the roller wheel $50_i$, and/or a different part of the lateral side $30_2$ of the roller wheel $50_i$. For instance, in some embodiments, the covering 62 may form less than all of the peripheral side 32 of the roller wheel $50_i$; may form a smaller or larger part of one or both of the lateral sides $30_1$, $30_2$ of the roller wheel $50_i$; or may form an entirety of the peripheral side 32 and the lateral sides $30_1$, $30_2$ of the roller wheel $50_i$.

Similarly, in other embodiments, the covering 62 may cover more or less of the wheel body 60 of the roller wheel $50_i$. For example, in some embodiments, the covering 62 may cover at least part of the radially-extending portion 65 and/or at least part of the hub portion 63 of the wheel body 60 (e.g., in some cases, the covering 62 may cover an entirety of the wheel body 60).

Figure 15:
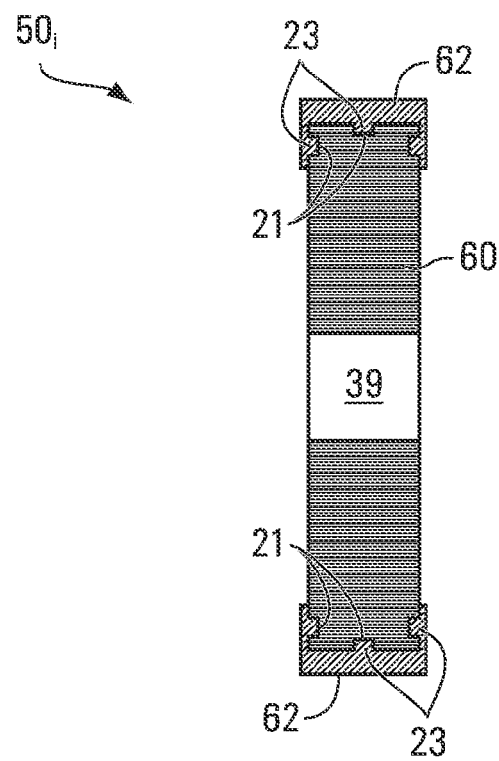
FIGS. 15 and 16 respectively show cross-sectional views of a wheel in accordance with other embodiments of the invention.
Figure 16:
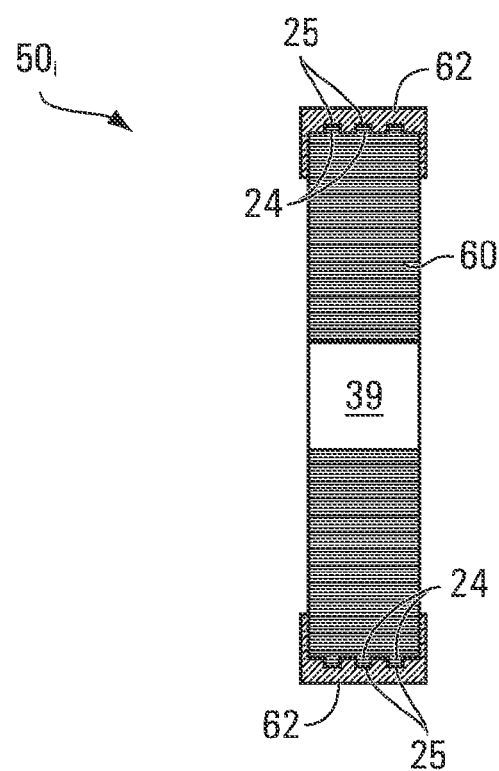

As another example, in other embodiments, the wheel body 60 and the covering 62 may be mechanically interlocked in other ways. For instance, in some embodiments, an interlocking hollow space of a given one of the wheel body 60 and the covering 62 and an interlocking part of the other one of the wheel body 60 and the covering 62 that extends into the interlocking hollow space may be configured in various other manners. For example, in some embodiments, as shown in FIG. 15, the wheel body 60 may comprise one or more recesses 21 in which extend one or more projections 23 of the covering 62. As another example, in some embodiments, as shown in FIG. 16, the wheel body 60 may comprise one or more projections 24 which extend into one or more recesses 25 of the covering 62.

As yet another example, although in this embodiment the mechanical interlock implemented by the covering 62 and the wheel body 60 is such that they are interconnected without requiring an adhesive nor a chemical bond between the covering 62 and the wheel body 60, in some embodiments, there may be an adhesive and/or a chemical bond between the covering 62 and the wheel body 60 in addition to the mechanical interlock.

As yet another example, although in this embodiment they are mechanically interlocked, the covering 62 and the wheel body 60 may be interconnected in other ways in other embodiments. For example, in some embodiments, the covering 62 and the wheel body 60 may be chemically bonded to one another and/or adhesively bonded to one another.

As yet another example, although in this embodiment the covering 62 is a molded covering, the covering 62 may be provided on the wheel body 60 during manufacturing of the roller wheel $50_i$ in various other manners in other embodiments. For instance, in some embodiments, the covering 62 may be a coated covering that is coated onto the wheel body 60.

Referring back to FIG. 1, in this embodiment, the front and rear idler wheels $50_1$, $50_2$, $50_{11}$, $50_{12}$ are constructed in a manner similar to the roller wheels $50_3$-$50_{10}$ but are larger than the roller wheels $50_3$-$50_{10}$. The front and rear idler wheels $50_1$, $50_2$, $50_{11}$, $50_{12}$ will therefore not be further described.

While in this embodiment the wheels $50_1$-$50_{12}$ are used as part of track assemblies of an ATV, in other embodiments, wheels constructed according to principles discussed herein may be used as part of track assemblies of other types of tracked vehicles.

Figure 18:
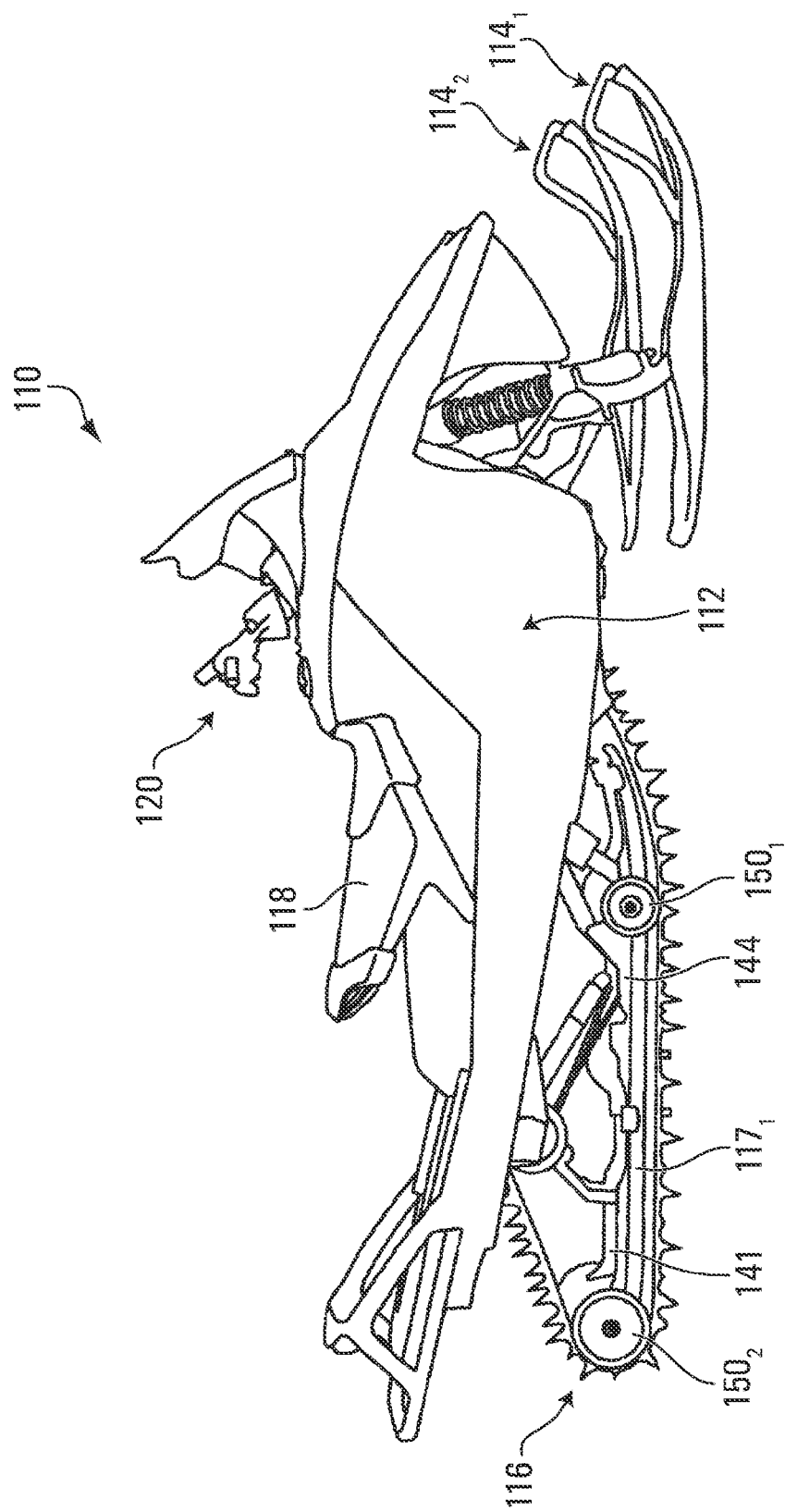
FIG. 18 shows another example of a tracked vehicle comprising a track assembly in accordance with another embodiment of the invention.

For example, FIG. 18 shows a snowmobile 110 in accordance with another embodiment of the invention. The snowmobile 110 is designed for travelling on snow, but in some cases may also be used to travel on ice or both snow and ice. In this embodiment, the snowmobile 110 comprises a prime mover 112, a track assembly 116, a pair of steering skis $114_1$, $114_2$, a seat 118, and a user interface 120.

The track assembly 116 engages the ground to provide traction to the snowmobile 110. In this embodiment, the track assembly 116 comprises a frame 144, a plurality of wheels including a drive wheel (not visible) in a front region of the track assembly 116 and a plurality of idler wheels $150_1$-$150_K$, a pair of slide rails $117_1$, $117_2$, and an endless track 141 disposed around these wheels and rails. Some of the idler wheels $150_1$-$150_K$ are rear idler wheels (trailing idler wheels) that maintain the track 141 in tension, and can help to support part of the weight of the snowmobile 110 on the ground via the track 141. Some of the idler wheels $150_1$-$150_K$ are roller wheels that roll on an inner side of the track 141 along a bottom run of the track 141 to apply the bottom run on the ground.

In this embodiment, each roller wheel $150_i$ is constructed according to principles discussed herein and is thus similar in construction to a roller wheel $50_i$ discussed previously.

Figure 19:
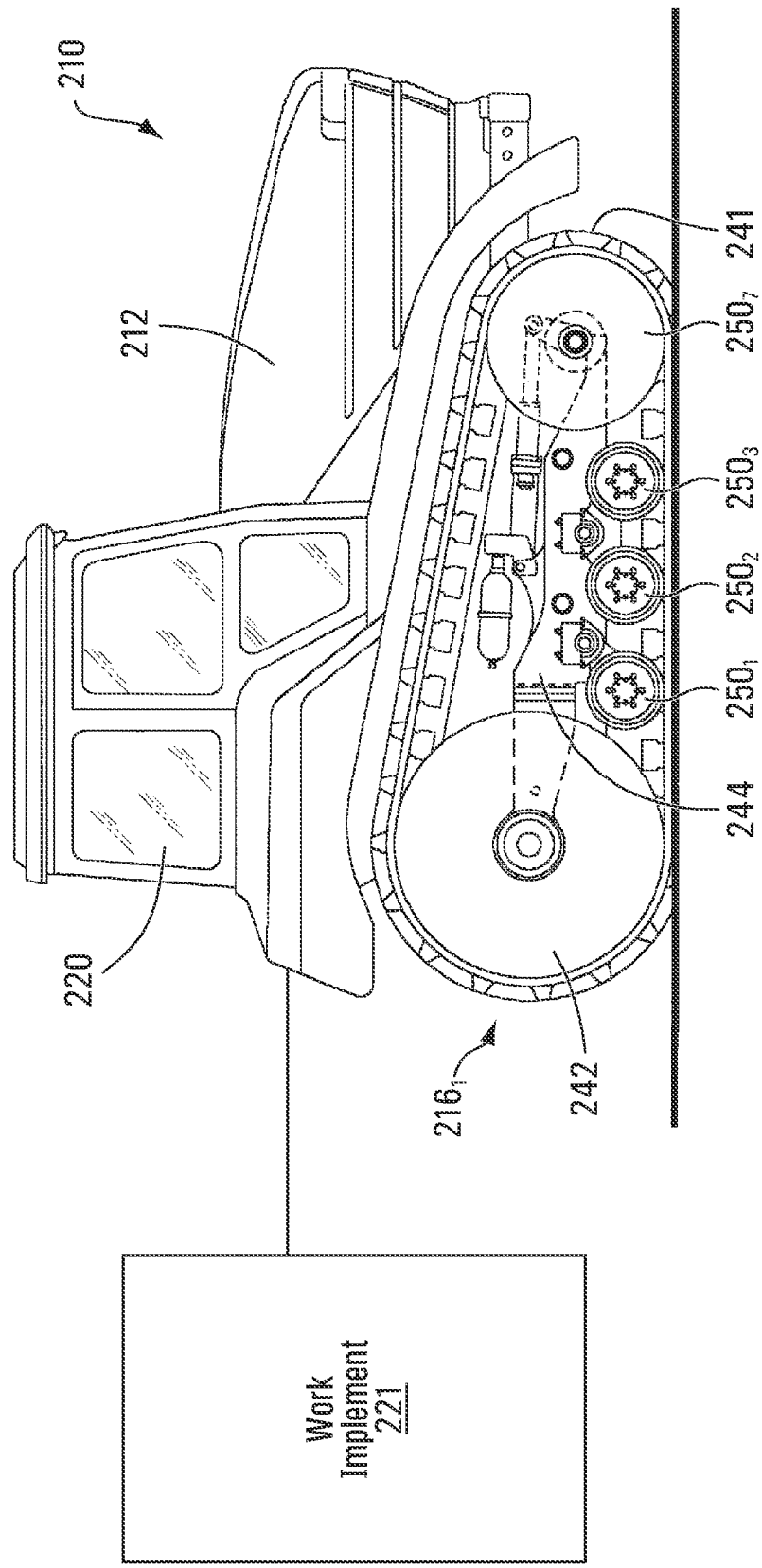
FIG. 19 shows another example of a tracked vehicle comprising track assemblies in accordance with another embodiment of the invention.
Figure 20:
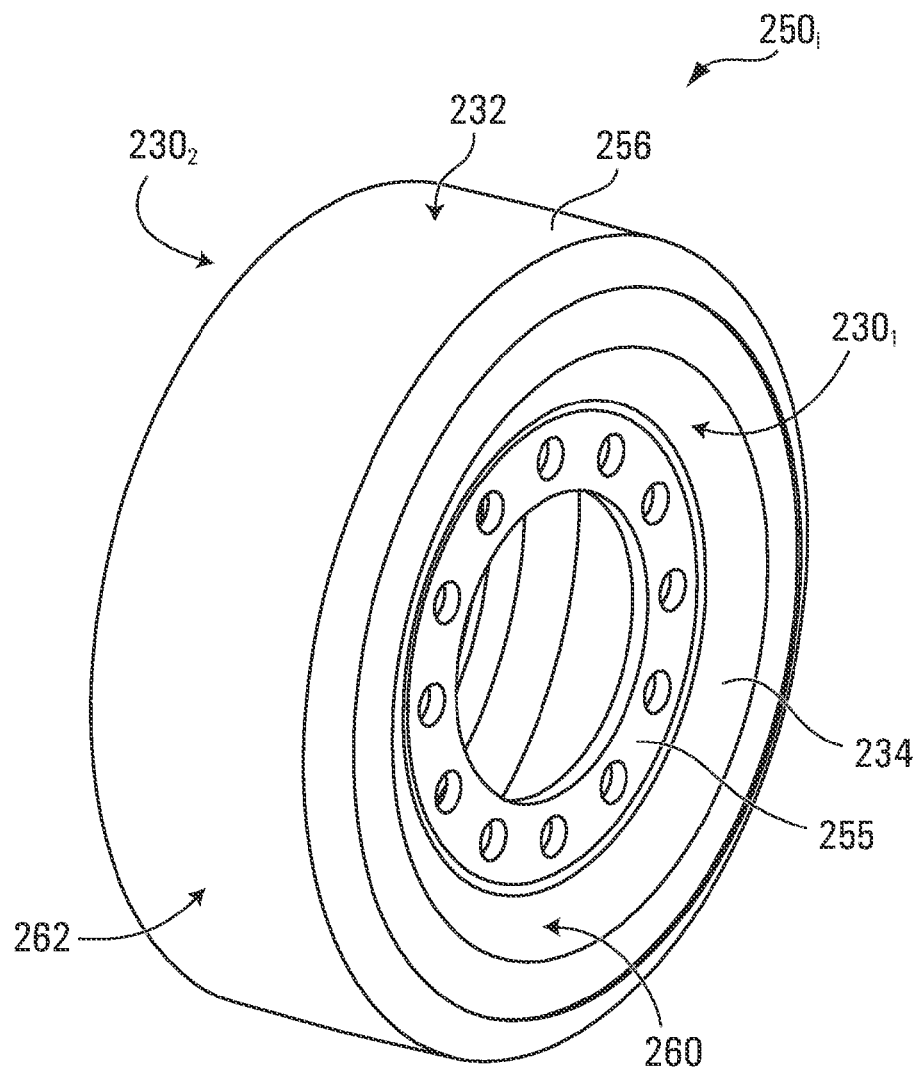
FIGS. 20 to 23 respectively show a first perspective view, a second perspective view, a side view, and a front view of a wheel of a track assembly of the tracked vehicle shown in FIG. 19.
Figure 21:
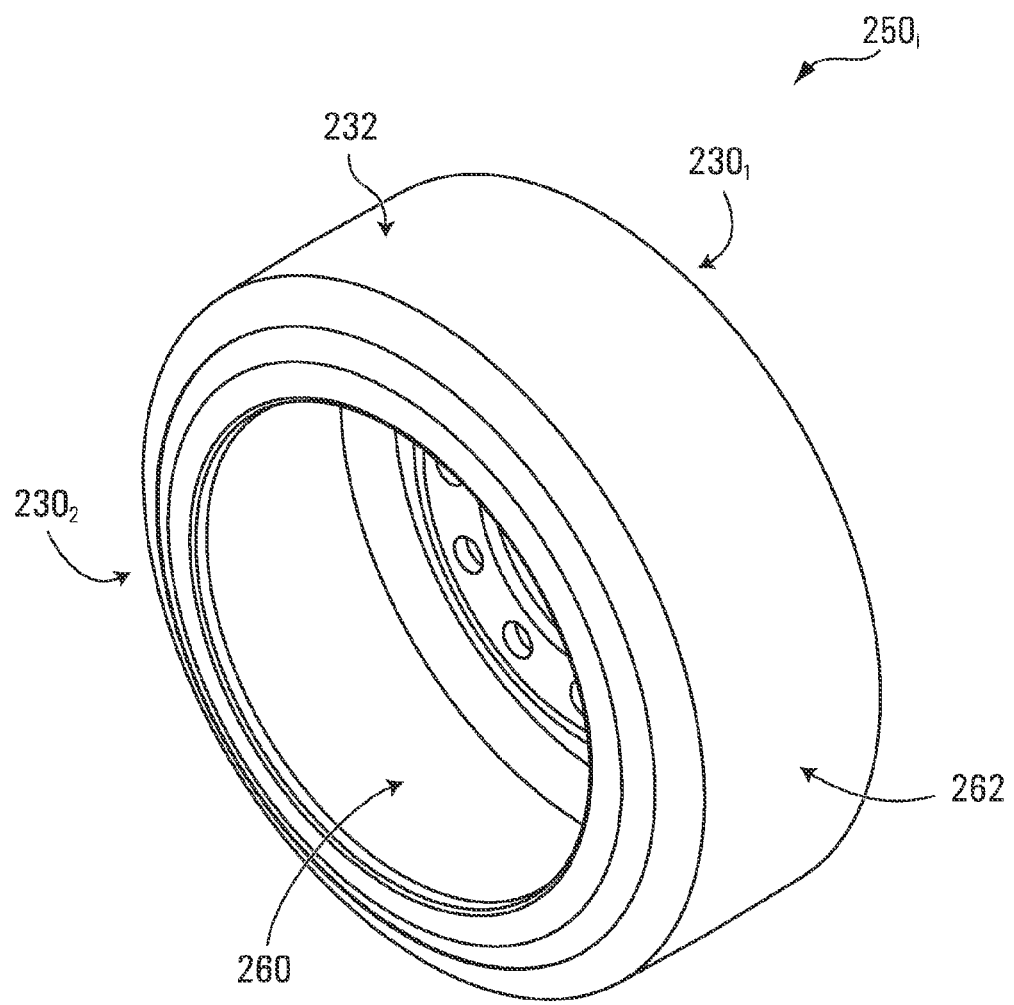
Figure 22:
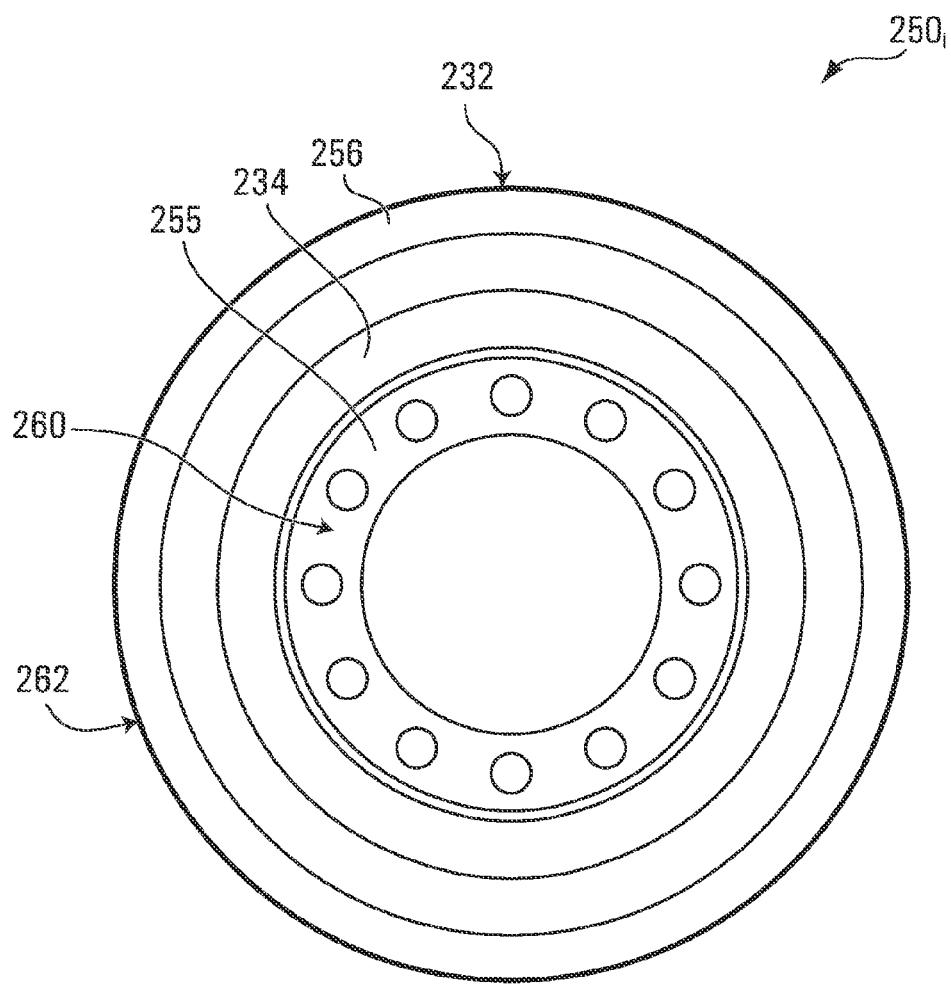
Figure 23:
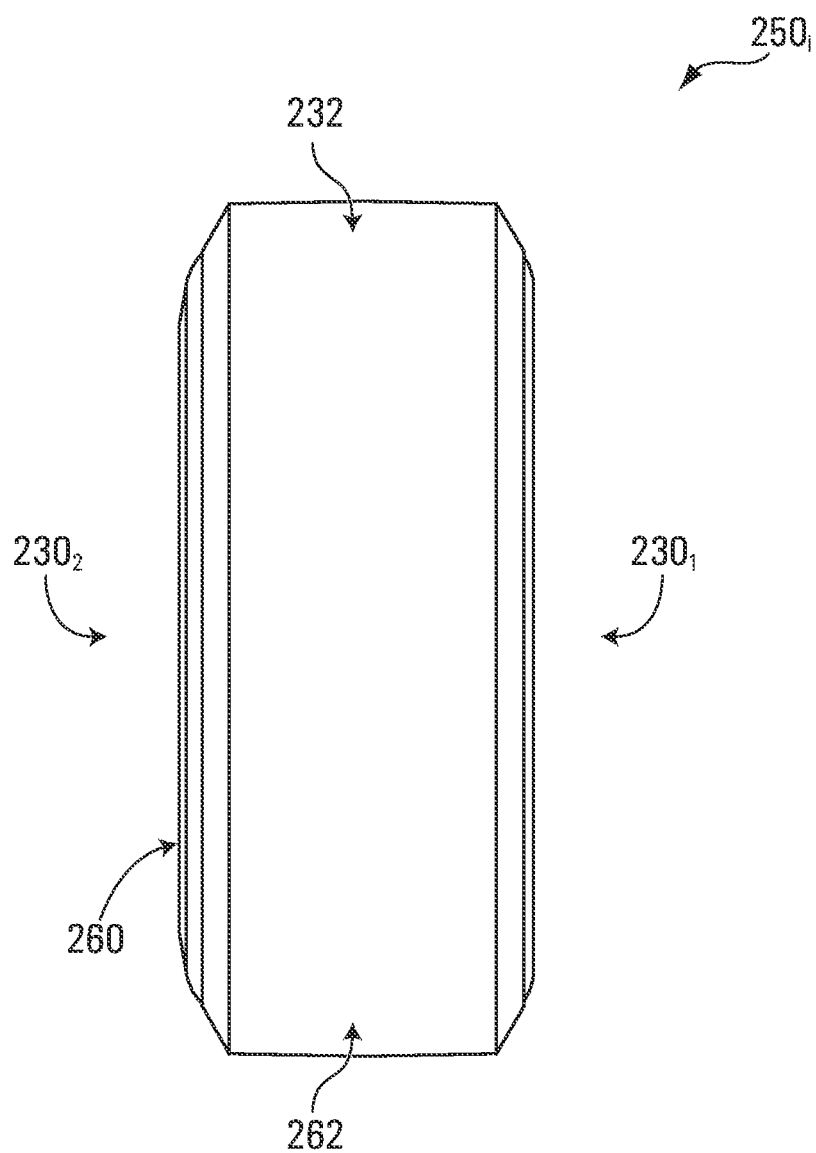
Figure 24:
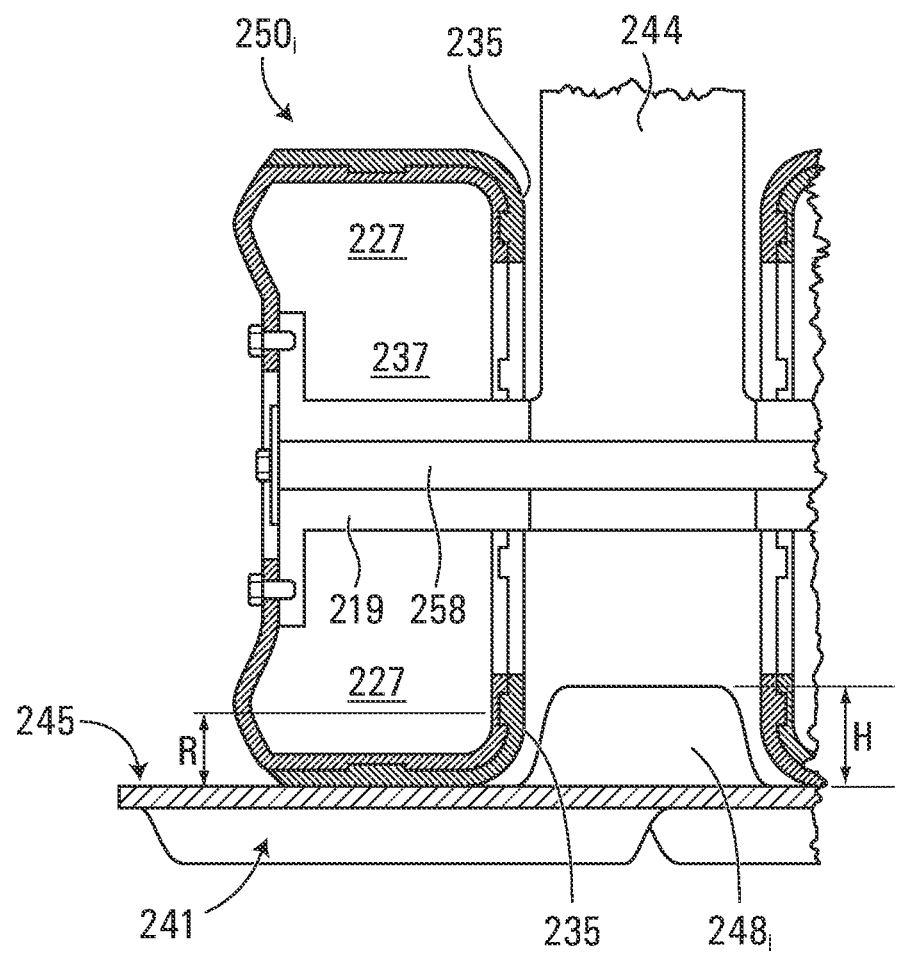
FIG. 24 shows the wheel of FIGS. 20 to 23 mounted on an axle of the tracked vehicle shown in FIG. 19.
Figure 30:
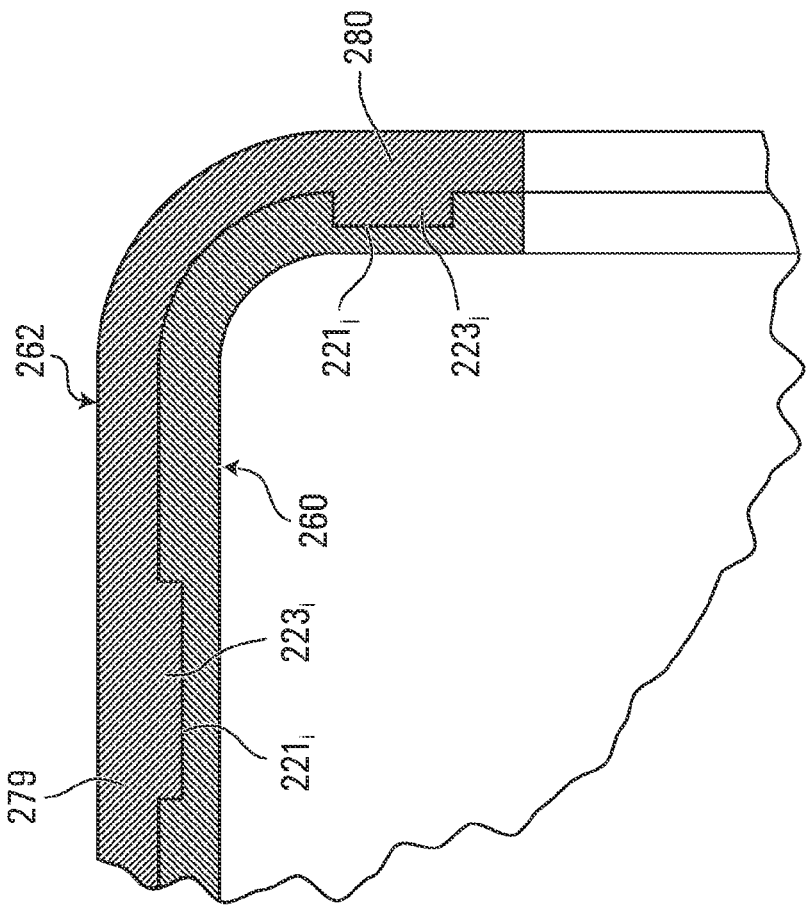
FIG. 30 is an enlarged view of part of the wheel shown in FIG. 29.
Figure 29:
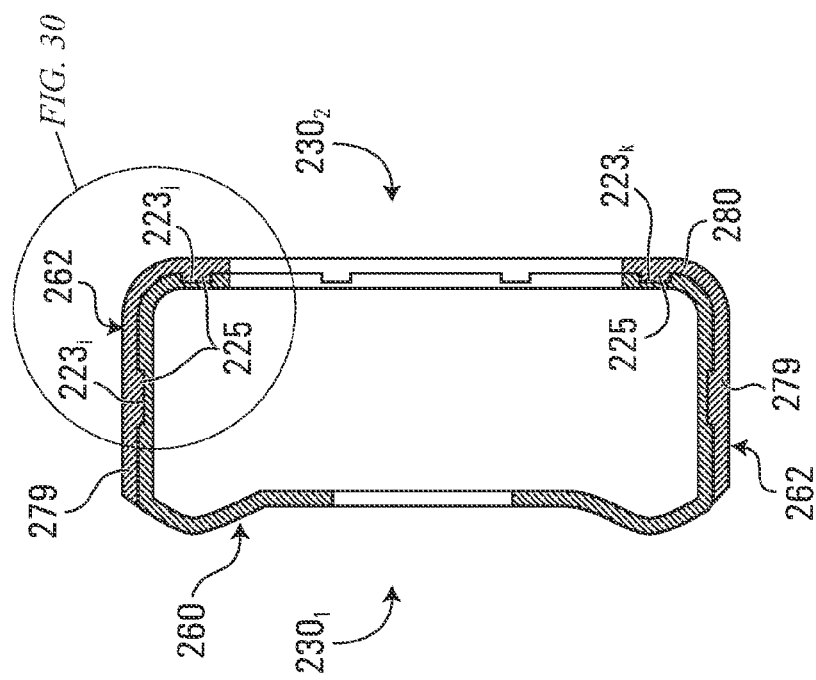
FIG. 29 shows a cross-sectional view of the wheel shown in FIGS. 20 to 23, illustrating a covering of the wheel on the wheel body of the wheel.
Figure 31:
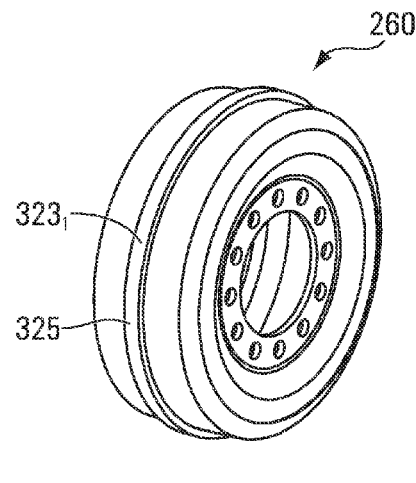
FIGS. 31 to 34 respectively show a first perspective view, a second perspective view, a side view, and a front view of a wheel body according to another embodiment of the invention.
Figure 32:
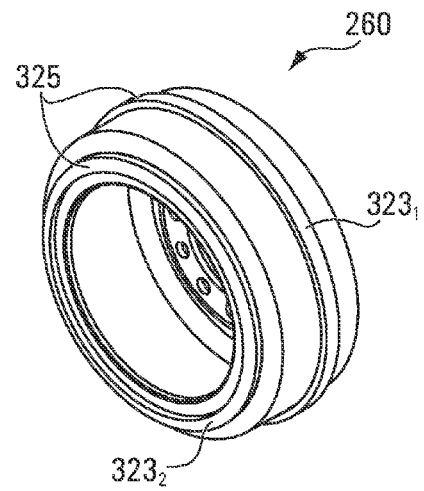
Figure 33:
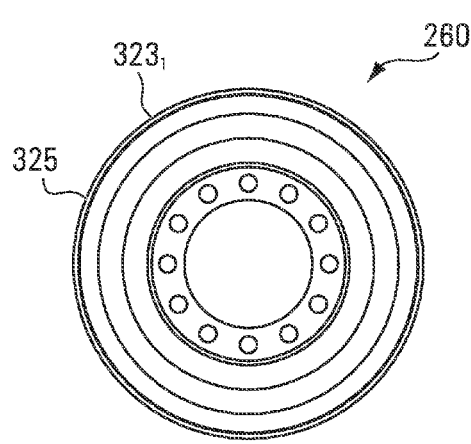
Figure 34:
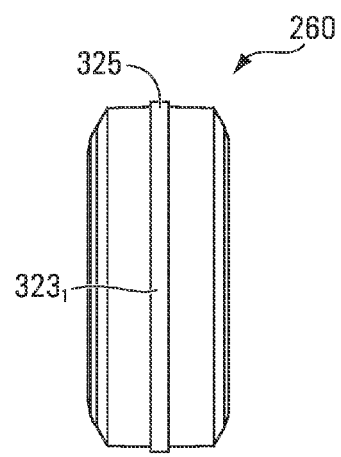
Figure 36:
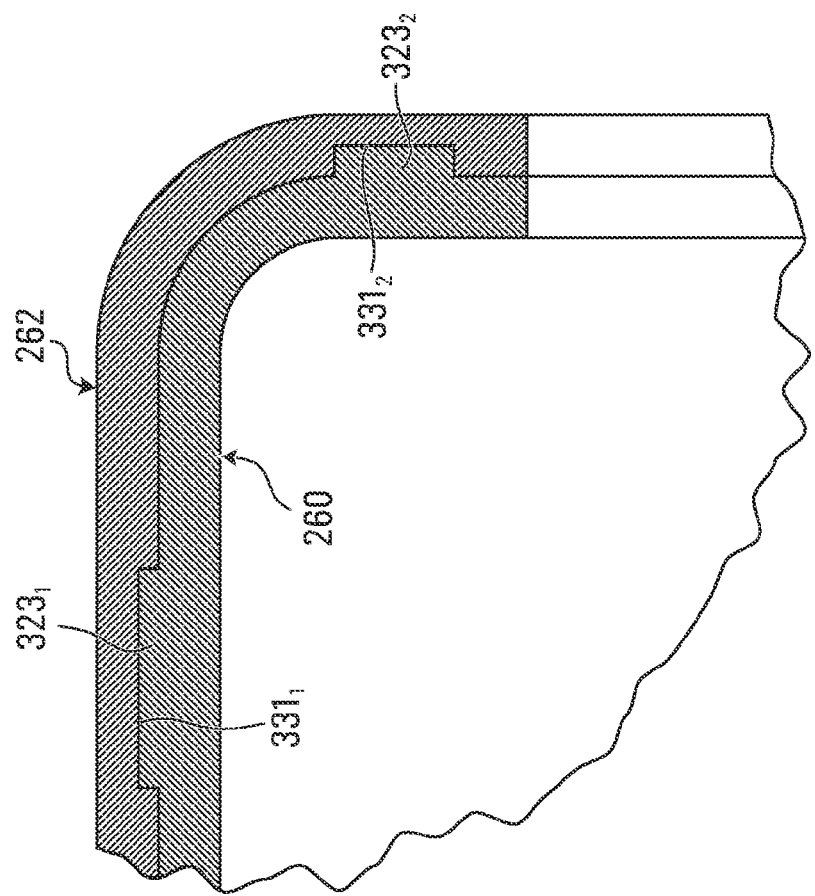
FIG. 36 is an enlarged view of part of the wheel shown in FIG. 35.
Figure 35:
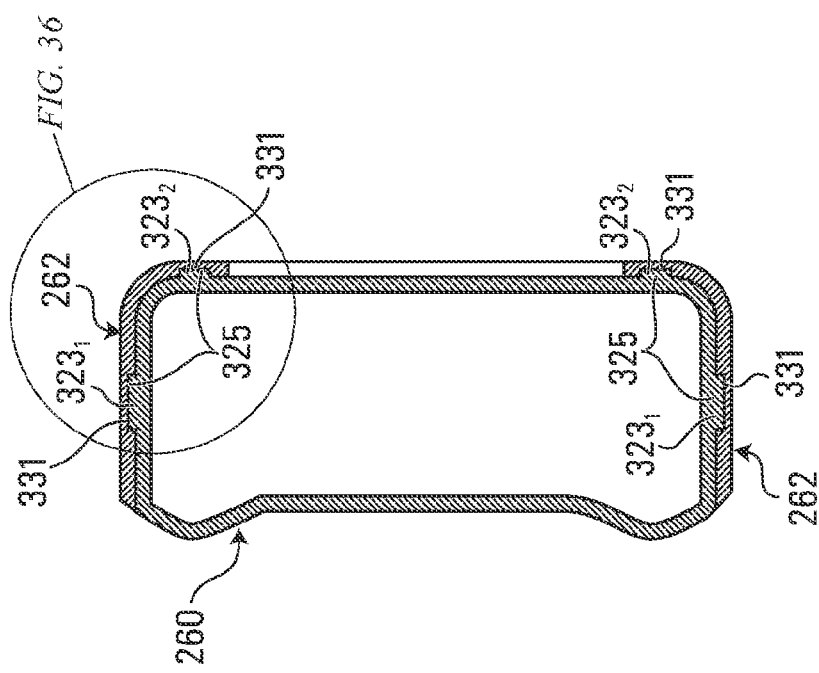
FIG. 35 shows a cross-sectional view of the wheel shown in FIGS. 31 to 34.
Figure 37:
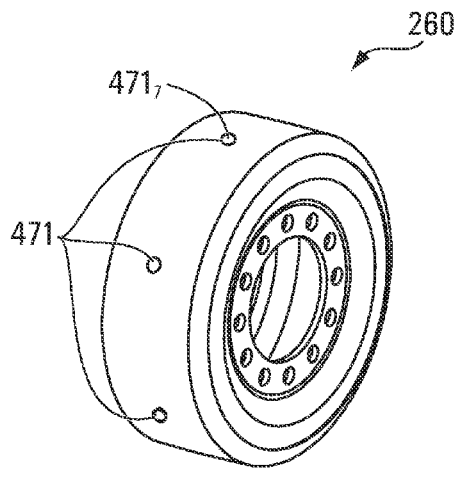
FIGS. 37 to 40 respectively show a first perspective view, a second perspective view, a side view, and a front view of a wheel body according to another embodiment of the invention.
Figure 38:
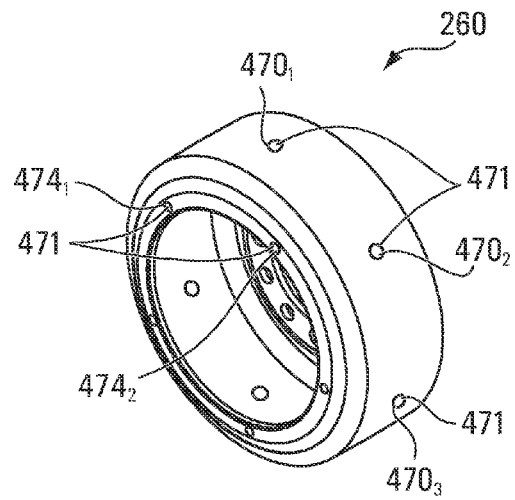
Figure 39:
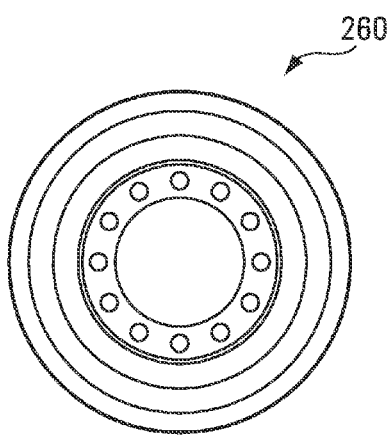
Figure 40:
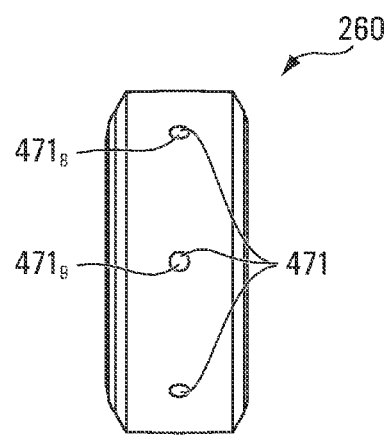
Figure 41:
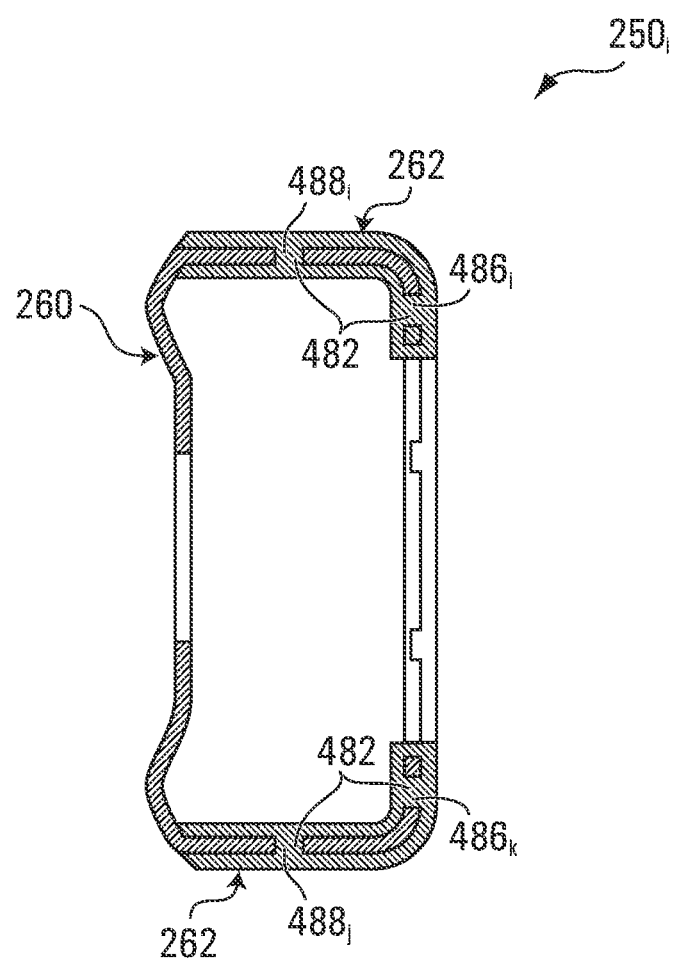
FIG. 41 shows a cross-sectional view of the wheel shown in FIGS. 37 to 40.

As another example, FIG. 19 shows a work vehicle 210 in accordance with another embodiment of the invention. In this embodiment, the work vehicle 210 is an agricultural vehicle for performing agricultural work. More specifically, in this example, the agricultural vehicle 210 is a tractor. In other examples, the agricultural vehicle 10 may be a combine harvester, another type of harvester, or any other type of agricultural vehicle. In this case, the agricultural vehicle 210 comprises a prime mover 212, a pair of track assemblies $216_1$, $216_2$ (which can be referred to as "undercarriages"), and an operator cabin 220, in which an operator can move the agricultural vehicle 210 on the ground to perform agricultural work using a working implement 221, such as a combine head, a cutter, a scraper, a tiller or any other type of agricultural working implement.

Each track assembly $216_i$ engages the ground to provide traction to the agricultural vehicle 210. In this embodiment, the track assembly $216_i$ comprises a frame 244, a plurality of wheels including a drive wheel 242 and a plurality of idler wheels $250_1$-$250_7$, and an endless track 241 disposed around these wheels. The idler wheel $250_7$ is a front idler wheel (leading idler wheel) that maintains the track 241 in tension, and can help to support part of the weight of the agricultural vehicle 210 on the ground via the track 241. The idler wheels $250_1$-$250_6$ are roller wheels that roll on an inner side of the track 241 along a bottom run of the track 241 to apply the bottom run on the ground. Since they are positioned between the front idler wheel $250_7$ and the drive wheel 242 in the longitudinal direction of the track assembly $216_i$, the roller wheels $250_1$-$250_6$ can be referred to as "mid-rollers".

With additional reference to FIGS. 20 to 30, each mid-roller $250_i$ comprises a hub portion 255, a rim portion 256, and a radially-extending portion 234 between the hub portion 255 and the rim portion 256. The hub portion 255 is an inner portion of the mid-roller $250_i$ which is associated with a hub 219 receiving an axle 258 for the mid-roller $250_i$. The rim portion 256 is an outer portion of the mid-roller $250_i$ which contacts an inner side 245 of the endless track 241. The radially-extending portion 234 is an intermediate portion of the mid-roller $250_i$ which extends radially between the hub portion 255 and the rim portion 256.

The mid-roller $250_i$ comprises a pair of lateral sides $230_1$, $230_2$ opposite one another and a peripheral side 232 between the lateral sides $230_1$, $230_2$. The peripheral side 232 rolls on the inner side 245 of the track 241 to apply a bottom run of track 241 on the ground. More particularly, in this embodiment, the inner side 45 of the track 241 comprises a rolling path on which the mid-roller $250_i$ rolls.

The mid-roller $250_i$ may contact a drive/guide lug $248_i$ of the endless track 241 adjacent to it during motion of the track 241. More particularly, in this embodiment, the lateral side $230_2$ of the mid-roller $250_i$, which faces the drive/guide lug $248_i$, comprises a projection-contacting portion 235 that can contact the drive/guide lug 248, when the mid-roller $250_i$ contacts the drive/guide lug $248_i$ as the drive/guide lug $248_i$ passes next to the mid-roller $250_i$. The projection-contacting portion 235, which will be referred to as a "lug-contacting portion", has a shape that depends on respective shapes of the mid-roller $250_i$ and the drive/guide lug $248_i$, but generally has a radial dimension R no greater than a height H of the drive/guide lug $248_i$.

In this embodiment, the mid-roller $250_i$ comprises a wheel body 260 and a covering 262 on the wheel body 260. The covering 262 may improve the performance of the mid-roller $250_i$, for example, by reducing friction between the mid-roller $250_i$ and the inner side 245 of the endless track 241, by enhancing an abrasion resistance of the mid-roller $250_i$, and/or by absorbing vibrations.

The wheel body 260 is a core of the mid-roller $250_i$ that imparts structural integrity to the mid-roller $250_i$. The wheel body 260 comprises a pair of lateral sides $217_1$, $217_2$ opposite one another and a peripheral side 272 between the lateral sides $217_1$, $217_2$. In this case, the lateral sides $217_1$, $217_2$ of the wheel body 260 form part of the lateral sides $230_1$, $230_2$ of the mid-roller $250_i$, while the peripheral side 272 of the wheel body 260 is covered by the covering 262.

The wheel body 260 comprises a hub portion 263, a rim portion 264, and a radially-extending portion 265 between the hub portion 263 and the rim portion 264. In this embodiment, the hub portion 263, the rim portion 264, and the radially-extending portion 265 of the wheel body 260 define an internal space 237 delimited by internal surfaces of the wheel body 260. The internal space 237 includes an internal circumferential channel 227 which is defined by a shoulder 261 of the wheel body 260.

The hub portion 263 of the wheel body 260 constitutes the hub portion 255 of the mid-roller $250_i$. The hub portion 263 of the wheel body 260 is thus associated with the hub 219. In this case, the hub 219 is removably mounted to the wheel body 260. More particularly, in this case, the hub portion 263 of the wheel body 260 comprises a plurality of openings in which are received a plurality of fasteners that interconnect the wheel body 260 to the hub 219. The hub portion 263 of the wheel body 260 may be configured in various other ways in other embodiments (e.g., the hub 219 may be integrally formed (e.g., cast) with or permanently affixed (e.g., welded) to the hub portion 263 of the wheel body 260).

The rim portion 264 of the wheel body 260 is part of the rim portion 256 of the mid-roller $250_i$. The rim portion 264 comprises the peripheral side 272 and outer parts of the lateral sides $217_1$, $217_2$ of the wheel body 260. Also, in this case, the rim portion 264 defines the internal circumferential channel 227 of the wheel body 260. The rim portion 264 may be configured in various other ways in other embodiments (e.g., the rim portion 264 may not comprise any shoulder such as the shoulder 261).

The radially-extending portion 265 of the wheel body 260 constitutes the radially-extending portion 234 of the mid-roller $250_i$. The radially-extending portion 265 interconnects the hub portion 263 and the rim portion 264. In this embodiment, the radially-extending portion 265 extends at an angle relative to the hub portion 263 and the rim portion 264 such that it has a truncated cone configuration. The radially-extending portion 265 may be configured in various other ways in other embodiments.

The wheel body 260 comprises at least one material, referred to as "wheel body material", making up the wheel body 260. That is, the wheel body 260 is made of one or more wheel body materials. In some cases, the wheel body 260 may include a single wheel body material making up an entirety of the wheel body 260. In other cases, the wheel body 260 may include two or more wheel body materials that make up different parts of the wheel body 260.

In this embodiment, the wheel body 260 is made of a single wheel body material. More particularly, in this embodiment, the wheel body material is metallic material. This metallic material is selected to provide strength and rigidity to the mid-roller $250_i$. For example, in this case, the metallic material is steel. In other cases, the wheel body material may be another metallic material. In other embodiments, the wheel body material may be another type of material (e.g., composite material, polymeric material, or ceramic material). Also, in other embodiments, different parts of the wheel body 260 may be made of two or more wheel body materials (e.g., two types of steel).

The covering 262 contacts the inner side 245 of the endless track 241 as the mid-roller $250_i$ rolls on the inner side 245 of the track 241. In this embodiment, the covering 262 forms at least part of the peripheral side 232 and at least part of at least one of the lateral sides $230_1$, $230_2$ of the mid-roller $250_i$. More particularly, in this embodiment, the covering 262 comprises a peripheral portion 279 that forms the peripheral side 232 of the mid-roller $250_i$ and a lateral portion 280 that forms part of the lateral side $230_2$ of the mid-roller $250_i$.

The covering 262 covers at least part of the wheel body 260 of the mid-roller $250_i$. In this embodiment, the covering 262 covers part of the rim portion 264 of the wheel body 260. More particularly, in this embodiment, the covering 262 covers the peripheral side 272 and part of the lateral side $217_2$ of the wheel body 260 that is in the rim portion 264 of the wheel body 260. Notably, the covering 262 covers at least part, in this case all, of an external surface of the shoulder 261 of the rim portion 264 of the wheel body 260.

The covering 262 comprises at least one material, referred to as "covering material", making up the covering 262. That is, the covering 262 is made of one or more covering materials. In some cases, the covering 262 may include a single covering material making up an entirety of the covering 262. In other cases, the covering 262 may include two or more covering materials that make up different parts of the covering 262.

In this embodiment, the covering 262 is made of a single covering material. The covering material is different from the wheel body material. That is, the covering material and the wheel body material may belong to different classes of materials (i.e., metals, polymers, ceramics and composites) and/or may substantially differ in terms of one or more properties, such as strength, elasticity, hardness, friction coefficient, etc. For instance, in some cases: a strength (e.g., yield strength) of the wheel body material may be different from (e.g., greater than) a strength of the covering material; a modulus of elasticity of the covering material may be different from (e.g., less than) a modulus of elasticity of the wheel body material; a hardness of the covering material may be different from (e.g., less than) a hardness of the wheel body material; an abrasion resistance of the covering material may be different from (e.g., greater than) an abrasion resistance of the wheel body material; a coefficient of friction of the covering material with the track 241 may be different from (e.g., less than) a coefficient of friction of the wheel body material with the track 241; etc.

More particularly, in this embodiment, the covering material is polymeric material. This polymeric material may be selected, for instance, to create a low-friction interface between the mid-roller $250_i$ and the inner side 245 of the endless track 241, to enhance an abrasion resistance of the mid-roller $250_i$, and/or to enhance a vibration absorption capacity of the mid-roller $250_i$.

In this example of implementation, the polymeric covering material of the covering 262 is an elastomeric material. For instance, in this case, the elastomeric material is a polyurethane elastomer. In other cases, the elastomeric material may be another elastomer instead of polyurethane (e.g., rubber). In other examples of implementation, the polymeric covering material may be another type of polymer which may or may not be elastomeric (e.g., polytetrafluoroethylene (PTFE) (Teflon™), ultra-high-molecular-weight polyethylene (UHMW), thermoplastic polyolefin (TPO), etc.).

In other embodiments, the covering material of the covering 262 may be another type of material (e.g., metallic material, ceramic material or composite material). Also, in other embodiments, different parts of the covering 262 may be made of two or more covering materials (e.g., two types of polymers).

In this example, the covering material has a coefficient of friction $\mu_C$ with the inner side 245 of the endless track 241 which can reduce friction between the mid-roller $250_i$ and the inner side 245 of the track 241. The peripheral portion 279 of the covering 262 thus reduces the rolling resistance of the mid-roller $250_i$ on the rolling path of the inner side 245 of the track 241. Also, the lateral portion 280 of the covering 262 reduces friction between the mid-roller $250_i$ and a drive/guide lug $248_i$ which may be contacted by the lug-contacting portion 235 as the drive/guide lug $248_i$ passes next to the mid-roller $250_i$. This may reduce wear of the mid-roller $250_i$ and/or the drive/guide lug $248_i$. This may also reduce a tendency of the mid-roller $250_i$ to "climb" on the drive/guide lug $248_i$.

The covering 262 and the wheel body 260 may be interconnected in various ways. In this embodiment, the covering 262 and the wheel body 260 are mechanically interlocked. That is, the covering 262 and the wheel body 260 are in a mechanical interlock relationship in which they are interconnected via a given one of the wheel body 260 and the covering 262 extending into the other one of the wheel body 260 and the covering 262. More specifically, a first one of the wheel body 260 and the covering 262 comprises an interlocking space into which extends an interlocking portion of a second one of the wheel body 260 and the covering 262. The interlocking space may comprise one or more holes, one or more recesses, and/or one or more other hollow areas. This mechanical interlock relationship restrains movement of the covering 262 relative to the wheel body 260. In some cases, the mechanical interlock relationship restrains all degrees of freedom of movement of the covering 262 relative to the wheel body 260. In other cases, the mechanical interlock relationship restrains some but not all of the degrees of freedom of movement of the covering 262 relative to the wheel body 260.

More particularly, in this embodiment, the wheel body 260 comprises an interlocking space 231 and the covering 262 comprises an interlocking portion 225 which extends into the interlocking space 231. In this embodiment, the interlocking space 231 comprises a plurality of recesses $221_1$-$221_S$ distributed on the peripheral side 272 and the lateral side $217_2$ of the wheel body 260, while the interlocking portion 225 comprises a plurality of projections $223_1$-$223_S$ that extend into respective ones of the recesses $221_1$-$221_3$.

The interlocking space 231 of the wheel body 260 and the interlocking portion 225 of the covering 262 may be configured in various other ways in other embodiments. For example, in other embodiments, the recesses $221_1$-$221_S$ and the projections $223_1$-$223_S$ may have various other shapes, the interlocking space 231 may comprise any other number of recesses (e.g., a single recess or two or more recesses) such as the recesses $221_1$-$221_3$ and the interlocking portion 225 may similarly comprise any other number of projections such as the projections $223_1$-$223_3$, etc.

FIGS. 31 to 36 show another embodiment in which the covering 262 comprises an interlocking space 331 and the wheel body 260 comprises an interlocking portion 325 which extends into the interlocking space 331. In this embodiment, the interlocking space 331 comprises a plurality of recesses $321_1$, $321_2$, while the interlocking portion 325 comprises a plurality of projections $323_1$, $323_2$ that extend into respective ones of the recesses $321_1$, $321_2$. Here again, various other configurations of the interlocking space 331 and the interlocking portion 325 may be used in other embodiments (e.g., the recesses $321_1$, $321_2$ and the projections $323_2$, $323_2$ may have various other shapes, the interlocking space 331 may comprise any other number of recesses such as the recesses $321_1$, $321_2$ and the interlocking portion 325 may similarly comprise any other number of projections such as the projections $323_1$, $323_2$, etc).

FIGS. 37 to 41 show another embodiment in which the wheel body 260 comprises an interlocking space 471 and the covering 262 comprises an interlocking portion 482 that extends into the interlocking space 471. In this embodiment, the interlocking space 471 comprises a plurality of holes $470_1$-$470_R$ distributed circumferentially along the peripheral side 232 of the wheel body 260, and a plurality of holes $474_1$-$474_P$ distributed circumferentially along the lateral side $217_2$ of the wheel body 260.

The interlocking portion 482 of the covering 262 occupies the holes $470_1$-$470_R$, $474_1$-$474_P$ of the interlocking space 471 of the wheel body 260. More specifically, in this case, the interlocking portion 482 of the covering 262 comprises a plurality of hole-occupying portions $488_1$-$488_R$ which occupy the holes $470_1$-$470_R$ of the wheel body 260 and a plurality of hole-occupying portions $486_1$-$486_P$ which occupy the holes $474_1$-$474_P$ of the wheel body 260.

The mechanical interlock relationship is created during manufacturing of the mid-roller $250_i$. For example, in the embodiments considered above, the covering 262 is overmolded on the wheel body 260. During overmolding of the covering 262, the covering material flows into the interlocking space of the wheel body 260 where it is captured so as to create the mechanical interlock relationship.

In some embodiments, such as those shown in FIGS. 20 to 36, the mechanical interlock relationship can enhance retention of the covering 262 on the wheel body 260 by providing an increased surface area of these components, and may be used with these components being adhesively or chemically bonded to one another. For example, in some embodiments, the covering 262 and the wheel body 260 may be adhesively bonded to one another by an adhesive provided between the covering 262 and the wheel body 260. Various types of adhesives may be used in various embodiments (e.g., Chemlock™ adhesives or other suitable commercially-available elastomer-to-substrate adhesives). As another example, in some embodiments, the covering 262 and the wheel body 260 may be chemically bonded to one another. That is, a chemical bond may be formed between the covering material of the covering 262 and the wheel body material of the wheel body 260 during manufacturing of the mid-roller $250_i$. For instance, in some embodiments, a brass plating may be applied on the wheel body 260 and the covering 262 may include a rubber having sulfur which reacts with the brass plating during curing to form an adhesion interphase between the covering 262 and the wheel body 260. This may be used to complement an adhesive bond between the covering 262 and the wheel body 260.

In other embodiments, such as that shown in FIGS. 37 to 41, the mechanical interlock relationship may be such that the covering 262 and the wheel body 260 are interconnected without requiring a chemical bond nor an adhesive between the covering 262 and the wheel body 260. Indeed, in some cases, there is no chemical bond and no adhesive bond between the covering 262 and the wheel body 260.

Such interconnection of the covering 262 and the wheel body 260 without requiring an adhesive nor a chemical bond between the covering 262 and the wheel body 260 allows more freedom in selecting the covering material and the wheel body material. For example, in some embodiments, the covering material and the wheel body material may be incompatible such that they cannot be chemically or adhesively bonded. Of course, in some embodiments, the covering material and the wheel body material may be compatible such that they can be chemically and/or adhesively bonded to one another. In fact, in some embodiments, there may be an adhesive and/or a chemical bond between the covering 262 and the wheel body 260 in addition to the mechanical interlock relationship.

Although in embodiments discussed above the covering 262 is a molded covering, the covering 262 may be provided on the wheel body 260 during manufacturing of the mid-roller 250$_i$ in various other ways in other embodiments. For example, in some embodiments, the covering 62 may be a coated covering that is coated onto the wheel body 260.

While in the embodiment considered above the work vehicle 210 is an agricultural vehicle, in other embodiments, the work vehicle 210 may be a construction vehicle (e.g., a loader, a bulldozer, an excavator, etc.) for performing construction work, a forestry vehicle (e.g., a feller-buncher, a tree chipper, a knuckleboom loader, etc.) for performing forestry work, a military vehicle (e.g., a combat engineering vehicle (CEV), etc.) for performing work in a military application, or any other vehicle operable off paved roads. Although operable off paved roads, an off-road vehicle may also be operable on paved roads in some cases. Also, while in the embodiment considered above the work vehicle 210 is driven by a human operator in the vehicle 210, in other embodiments, the work vehicle 210 may be an unmanned ground vehicle (e.g., a teleoperated or autonomous unmanned ground vehicle).

Although various embodiments and examples have been presented, this was for the purpose of describing, but not limiting, the invention. Various modifications and enhancements will become apparent to those of ordinary skill in the art and are within the scope of the invention, which is defined by the appended claims.

The invention claimed is:

1. A wheel for a track assembly of a tracked vehicle, the wheel in use being one of a plurality of wheels of the track assembly, the track assembly comprising an endless track disposed around the plurality of wheels, the endless track comprising an inner side for facing the plurality of wheels and a ground-engaging outer side for engaging the ground, the wheel comprising:
a wheel body comprising a hub portion, a rim portion, and a radially-extending portion between the hub portion and the rim portion, the wheel body comprising a wheel body material; and
a covering on the wheel body, the covering in use contacting the inner side of the endless track, the covering comprising a covering material different from the wheel body material, the wheel body and the covering being mechanically interlocked.

2. The wheel claimed in claim 1, wherein a given one of the wheel body and the covering comprises a hole and the other one of the wheel body and the covering extends into the hole to mechanically interlock the wheel body and the covering.

3. The wheel claimed in claim 2, wherein the given one of the wheel body and the covering is the wheel body.

4. The wheel claimed in claim 1, wherein a given one of the wheel body and the covering comprises a plurality of holes and the other one of the wheel body and the covering extends into the holes to mechanically interlock the wheel body and the covering.

5. The wheel claimed in claim 1, wherein a given one of the wheel body and the covering comprises a recess and the other one of the wheel body and the covering extends into the recess to mechanically interlock the wheel body and the covering.

6. The wheel claimed in claim 5, wherein the given one of the wheel body and the covering is the wheel body.

7. The wheel claimed in claim 1, wherein a given one of the wheel body and the covering comprises a plurality of recesses and the other one of the wheel body and the covering extends into the recesses to mechanically interlock the wheel body and the covering.

8. The wheel claimed in claim 1, wherein a given one of the wheel body and the covering comprises a hole and a recess and the other one of the wheel body and the covering extends into the hole and into the recess to mechanically interlock the wheel body and the covering.

9. The wheel claimed in claim 8, wherein the given one of the wheel body and the covering is the wheel body.

10. The wheel claimed in claim 1, wherein the covering is overmolded on the wheel body.

11. The wheel claimed in claim 1, wherein a mechanical interlock relationship between the wheel body and the covering restrains all degrees of freedom of movement of the covering relative to the wheel body.

12. The wheel claimed in claim 1, wherein a mechanical interlock relationship between the wheel body and the covering is such that the wheel body and the covering are interconnected without requiring an adhesive bond between the wheel body and the covering.

13. The wheel claimed in claim 1, wherein there is no adhesive bond between the wheel body and the covering.

14. The wheel claimed in claim 1, wherein a mechanical interlock relationship between the wheel body and the covering is such that the wheel body and the covering are interconnected without requiring a chemical bond between the wheel body and the covering.

15. The wheel claimed in claim 1, wherein there is no chemical bond between the wheel body and the covering.

16. The wheel claimed in claim 1, wherein the wheel body material is a first polymeric material and the covering material is a second polymeric material different from the first polymeric material.

17. The wheel claimed in claim 16, wherein the first polymeric material is not elastomeric and the second polymeric material is elastomeric.

18. The wheel claimed in claim 17, wherein the second polymeric material is polyurethane.

19. The wheel claimed in claim 1, wherein the wheel body comprises a first lateral side, a second lateral side opposite the first lateral side, and a peripheral side between the first lateral side and the second lateral side, the covering comprising a peripheral portion covering at least part of the peripheral side of the wheel body and a lateral portion covering at least part of the first lateral side of the wheel body.

20. The wheel claimed in claim 19, wherein the lateral portion of the covering is a first lateral portion, the covering comprising a second lateral portion covering at least part of the second lateral side of the wheel body.

21. The wheel claimed in claim 19, wherein the inner side of the endless track comprises a plurality of wheel-contacting projections spaced apart along a longitudinal direction of the endless track, the wheel comprising a projection-contacting portion in contact with a given one of the wheel-contacting projections when the wheel contacts the given one of the wheel-contacting projections, the lateral portion of the covering forming at least part of the projection-contacting portion of the wheel.

22. The wheel claimed in claim 21, wherein the wheel body comprises a lateral portion forming at least part of the projection-contacting portion of the wheel.

23. The wheel claimed in claim 22, wherein the lateral portion of the wheel body comprises a plurality of lateral parts spaced apart circumferentially by a plurality of lateral parts of the lateral portion of the covering.

24. The wheel claimed in claim 1, wherein a coefficient of friction of the covering material with the inner side of the endless track is less than a coefficient of friction of the wheel body material with the inner side of the endless track.

25. The wheel claimed in claim 1, wherein the hub portion comprises a bearing defining an opening for receiving an axle, the wheel body material being overmolded on the bearing.

26. The wheel claimed in claim 1, wherein the wheel is a roller wheel for rolling on the inner side of the endless track.

27. The wheel claimed in claim 1, wherein the tracked vehicle is an all-terrain vehicle (ATV).

28. The wheel claimed in claim 1, wherein the tracked vehicle is a snowmobile.

29. The wheel claimed in claim 1, wherein the tracked vehicle is an agricultural vehicle or a construction vehicle.

30. A track assembly for providing traction to a tracked vehicle, the track assembly comprising a plurality of wheels and an endless track disposed around the plurality of wheels, the endless track comprising an inner side for facing the plurality of wheels and a ground-engaging outer side for engaging the ground, the plurality of wheels including a drive wheel for driving the endless track, a given wheel of the plurality of wheels comprising:
- a wheel body comprising a hub portion, a rim portion, and a radially-extending portion between the hub portion and the rim portion, the wheel body comprising a wheel body material; and
- a covering on the wheel body, the covering contacting the inner side of the endless track, the covering comprising a covering material different from the wheel body material, the wheel body and the covering being mechanically interlocked.

31. A wheel for a track assembly of a tracked vehicle, the wheel in use being one of a plurality of wheels of the track assembly, the track assembly comprising an endless track disposed around the plurality of wheels, the endless track comprising an inner side for facing the plurality of wheels and a ground-engaging outer side for engaging the ground, the wheel comprising:
- a wheel body comprising a hub portion, a rim portion, and a radially-extending portion between the hub portion and the rim portion, the wheel body comprising a first lateral side and a second lateral side opposite one another and a peripheral side between the first lateral side and the second lateral side, the wheel body comprising a wheel body material; and
- a covering on the wheel body, the covering in use contacting the inner side of the endless track, the covering comprising a covering material different from the wheel body material, the covering comprising a peripheral portion covering at least part of the peripheral side of the wheel body and a lateral portion covering at least part of the first lateral side of the wheel body.

32. A track assembly for providing traction to a tracked vehicle, the track assembly comprising a plurality of wheels and an endless track disposed around the plurality of wheels, the endless track comprising an inner side for facing the plurality of wheels and a ground-engaging outer side for engaging the ground, the plurality of wheels including a drive wheel for driving the endless track, a given wheel of the plurality of wheels comprising:
- a wheel body comprising a hub portion, a rim portion, and a radially-extending portion between the hub portion and the rim portion, the wheel body comprising a first lateral side and a second lateral side opposite one another and a peripheral side between the first lateral side and the second lateral side, the wheel body comprising a wheel body material; and
- a covering on the wheel body, the covering in use contacting the inner side of the endless track, the covering comprising a covering material different from the wheel body material, the covering comprising a peripheral portion covering at least part of the peripheral side of the wheel body and a lateral portion covering at least part of the first lateral side of the wheel body.

\* \* \* \* \*